(12) United States Patent
White

(10) Patent No.: US 11,912,367 B2
(45) Date of Patent: *Feb. 27, 2024

(54) MOTORCYCLE

(71) Applicant: White Motorcycle Concepts Limited, Brixworth (GB)

(72) Inventor: Robert James White, Brixworth (GB)

(73) Assignee: WHITE MOTORCYCLE CONCEPTS LIMITED, Brixworth (GB)

( * ) Notice: Subject to any disclaimer, the term of this patent is extended or adjusted under 35 U.S.C. 154(b) by 0 days.

This patent is subject to a terminal disclaimer.

(21) Appl. No.: 17/730,554

(22) Filed: Apr. 27, 2022

(65) Prior Publication Data
US 2022/0315152 A1 Oct. 6, 2022

Related U.S. Application Data

(63) Continuation of application No. 17/266,866, filed as application No. PCT/EP2019/071340 on Aug. 8, 2019, now Pat. No. 11,345,425.

(30) Foreign Application Priority Data

Aug. 9, 2018 (GB) .................................... 1812934

(51) Int. Cl.
| | |
|---|---|
| *B62J 17/10* | (2020.01) |
| *B62K 11/04* | (2006.01) |
| *B62K 25/24* | (2006.01) |

(52) U.S. Cl.
CPC ............... *B62J 17/10* (2020.02); *B62K 11/04* (2013.01); *B62K 25/24* (2013.01)

(58) Field of Classification Search
CPC ........... B62J 17/10; B62K 11/04; B62K 25/24
See application file for complete search history.

(56) References Cited

U.S. PATENT DOCUMENTS

| | | | | |
|---|---|---|---|---|
| 4,709,774 A * | 12/1987 | Saito | ......................... | B62J 17/02 180/68.1 |
| 4,818,012 A * | 4/1989 | Kohama | .................. | B62J 23/00 180/68.1 |
| 4,830,135 A * | 5/1989 | Yamashita | ............. | B60K 11/08 180/68.1 |
| 4,913,256 A * | 4/1990 | Sakuma | .................... | B62J 17/10 180/68.1 |
| 4,964,484 A * | 10/1990 | Buell | ...................... | B60K 11/08 180/219 |
| 7,059,438 B1 * | 6/2006 | Sheets | ...................... | B62J 40/10 474/93 |
| 7,410,025 B2 * | 8/2008 | Sunaguchi | ............... | B62J 17/02 180/219 |
| 7,654,357 B2 * | 2/2010 | Buell | ........................ | F01P 3/18 180/68.4 |

(Continued)

*Primary Examiner* — Tony H Winner
(74) *Attorney, Agent, or Firm* — IPro, PLLC

(57) ABSTRACT

In an embodiment, there is provided a motorcycle comprising at least one front wheel, at least one rear wheel and a vehicle body, the vehicle body comprising a substantially open elongate duct extending longitudinally through a central portion of the vehicle body between an open inlet aperture arranged at a front portion of the vehicle body and an open outlet aperture arranged at a rear portion of the vehicle body.

20 Claims, 20 Drawing Sheets

(56) References Cited

U.S. PATENT DOCUMENTS

2003/0000755 A1* 1/2003 Schroeder ................ B62J 17/02
  180/229
2013/0057016 A1* 3/2013 Yamada ................... B62J 17/02
  296/78.1

* cited by examiner

MOTORCYCLE

The present invention relates to an improved motorcycle.

To date, seeking benefits in terms of efficiency and top speed, numerous attempts have been made to improve the aerodynamic efficiency of motorised wheeled vehicles. However, whilst significant improvements have been made in reducing the aerodynamic drag of four wheeled vehicles such as motor cars, attempts to improve the aerodynamic efficiency of motorcycles have been, to date, less successful.

An early attempt to improve the aerodynamic efficiency of a motorcycle was to incorporate a partially-enclosed aerodynamic fairing on the front of a motorcycle. Such designs were common in competition motorcycles from the interwar period until the late 1950's and included models such as the NSU Sportmax and Moto Guzzi 500 V8.

Streamlined nose fairings were successful in reducing the aerodynamic drag on a competition motorcycle and, consequently, such designs had a correspondingly higher top speed for a given engine power when compared to conventional designs. However, whilst such designs were efficient in a straight line, they presented significant and dangerous drawbacks when cornering. In essence, the aerodynamic fairing placed the centre of pressure of the motorcycle well ahead of the centre of gravity. This resulted in a strong yaw force on the motorcycle, leading to significant lateral instability during cornering or in crosswind conditions. This resulted in numerous accidents and such designs were banned from competitive motorsport in 1958.

In more recent times, aerodynamic efficiency gains in motorcycles have been modest and have resulted mostly from more efficient packaging or reduced size of the component parts of the motorcycle (e.g. transmission, engine, radiators, heat exchangers etc.) rather than dedicated aerodynamic design per se.

Further, attempts to use aerodynamic design for competitive advantage in motorsport has focused mainly on improving downforce or more effectively guiding air around the rider, as shown in, for example, MotoGP designs from 2016 and 2017, where small front wings, winglets and vortex generators attempted to create additional downforce and prevent airflow breakaway downstream of the rider.

However, in general, generation of downforce increases the drag on a motorcycle since it is necessary to use aerodynamic surfaces such as wings and spoilers. The limited underfloor size and need to lean in corners generally precludes the use of low drag downforce-generating components such as diffusers on motorcycles.

In addition, downforce generation in known designs can be problematic in cornering, since the generated force acts through the vertical axis of the chassis through the centre of the tyre contact patch. Thus, when a motorcycle is leaning through a corner, this creates a component of the downforce acting outwardly in a corner, reducing the lateral grip available.

To date, attempts to improve the aerodynamic efficiency of motorcycles have met with limited success. It is a technical object of the present invention to address, in embodiments, these issues.

According to a first aspect of the present invention, there is provided a motorcycle comprising at least one front wheel, at least one rear wheel and a vehicle body, the vehicle body comprising a substantially open elongate duct extending longitudinally through a central portion of the vehicle body between an open inlet aperture arranged at a front portion of the vehicle body and an open outlet aperture arranged at a rear portion of the vehicle body.

In one embodiment, the open inlet aperture is located adjacent the front wheel and/or the open outlet aperture is located adjacent the rear wheel. In one embodiment, the longitudinal centreline plane extends through at least a part of the elongate duct.

In one embodiment, the inlet aperture, outlet aperture and elongate duct are located and arranged to define a line of sight between at least a part of the inlet aperture and at least a part of the outlet aperture through the elongate duct.

In one embodiment, the inlet aperture, outlet aperture and elongate duct are located and arranged to define a line of sight between at least a part of the inlet aperture and at least a part of the outlet aperture through the elongate duct in a direction substantially parallel to the longitudinal centreline plane of the vehicle body.

In one embodiment, the elongate duct comprises an inlet portion adjacent the inlet aperture, a central portion and an outlet portion adjacent the outlet aperture, and wherein the central portion of the duct has a smaller cross sectional area than the inlet aperture and/or the outlet aperture.

In one embodiment, the inlet portion of the duct tapers inwardly from the inlet aperture towards the central portion such that the cross-sectional area decreases from the inlet aperture to the central portion. In one embodiment, the outlet portion of the duct tapers outwardly from the central portion towards the outlet such that the cross-sectional area increases from the central portion to the outlet aperture.

In one embodiment, the duct has a central longitudinal axis and wherein one or more interior walls of the inlet portion and/or outlet portion of the duct are arranged at an angle to the central longitudinal axis in the range of 1 to 10 degrees. In one embodiment, the duct has a venturi profile. In one embodiment, the inlet aperture and/or the outlet aperture has a frontal cross-sectional area between 10 and 40% of the total frontal cross-sectional area of the motorcycle. In one embodiment, the inlet aperture and/or the outlet aperture has a frontal cross-sectional area between 15 and 35% of the total frontal cross-sectional area of the motorcycle.

In one embodiment, the inlet aperture and/or the outlet aperture has a width greater than 20% of the total width of the motorcycle body. In one embodiment, the inlet aperture and/or the outlet aperture has a width greater than 40% of the total width of the motorcycle body. In one embodiment, the inlet aperture and/or the outlet aperture has a width greater than 50% of the total width of the motorcycle body.

In one embodiment, central portion has a cross-sectional area in the range of 10,000 mm2 to 90,000 mm2.

In one embodiment, the inlet aperture, outlet aperture and/or elongate duct has a substantially rectangular cross-section. In one embodiment, the elongate duct comprises substantially planar surfaces. In one embodiment, the vehicle body further comprises a seat for a rider and a power source located between the front and rear wheels, wherein the duct extends through the vehicle body between the seat and the power source.

In one embodiment, the power source comprises an internal combustion engine and/or an electric motor. In one embodiment, the power source comprises an internal combustion engine and at least one elongate radiator element having a longitudinal axis and operable to provide cooling in response to an airflow passing through the radiator element in a direction substantially perpendicular to the longitudinal axis of the radiator element from an upstream side to a downstream side, wherein the or each radiator element is located substantially parallel to the longitudinal centreline of the motorcycle body. In one embodiment, the or each radiator element is arranged such that the downstream side of the or each radiator element is in fluid communication with the interior of the duct.

In one embodiment, the or each radiator element has a radiator duct separate from the elongate duct, the radiator duct extending from a radiator intake to the upstream side of the respective radiator element such that a flow path is defined from the radiator intake through the radiator element into the interior of the elongate duct. In one embodiment, a plurality of radiator elements are provided. In one embodiment, the internal combustion engine comprises a supercharger and at least one radiator element comprises an intercooler.

In one embodiment, the elongate duct further comprises a deflector element movable between a first position in which the deflector element enables substantially unrestricted airflow through the interior of the elongate duct between the inlet aperture and outlet aperture to a second position in which airflow through the interior of the elongate duct is substantially restricted. In one embodiment, the deflector element is pivotable between the first and second positions.

In one embodiment, the deflector element is located within the interior of the elongate duct.

In one embodiment, the deflector element has a substantially planar configuration and in the first position is arranged substantially parallel to the airflow through the elongate duct and in the second position is arranged at an angle to the airflow such that the elongate duct is substantially closed. In one embodiment, the deflector element is arranged in the second position to direct the airflow out of the elongate duct through a deflection aperture separate from the outlet aperture.

In an embodiment, there is provided a motorcycle comprising at least one front wheel, at least rear wheel and a vehicle body, the vehicle body comprising a lower structural portion and an upper structural portion, the lower structural portion comprising a power unit and being connected to the front wheel and to the rear wheel, wherein the upper portion is removable from the lower structural portion. In an embodiment, the upper structural portion comprises a monocoque. In an embodiment, the lower structural portion comprises a frame portion surrounding the power unit.

In an embodiment, there is provided a motorcycle comprising at least one front wheel, at least rear wheel and a vehicle body comprising a power source and an elongate duct extending through the interior of the vehicle body, the power source comprising and at least one elongate heat exchanger element having a longitudinal axis and operable to provide cooling in response to an airflow passing through the heat exchanger element in a direction substantially perpendicular to the longitudinal axis of the heat exchanger element from an upstream side to a downstream side, wherein the or each heat exchanger element is located and arranged such that the downstream side of the or each heat exchanger element is in fluid communication with the interior of the duct.

In an embodiment, the or each heat exchanger element has a heat exchanger duct separate from the elongate duct, the heat exchanger duct extending from a heat exchanger intake to the upstream side of the respective heat exchanger element such that a flow path is defined from the heat exchanger intake through the heat exchanger element into the interior of the elongate duct.

Embodiments of the present invention will now be described in detail with reference to the accompanying drawings, in which.

Figures 1, 1A:
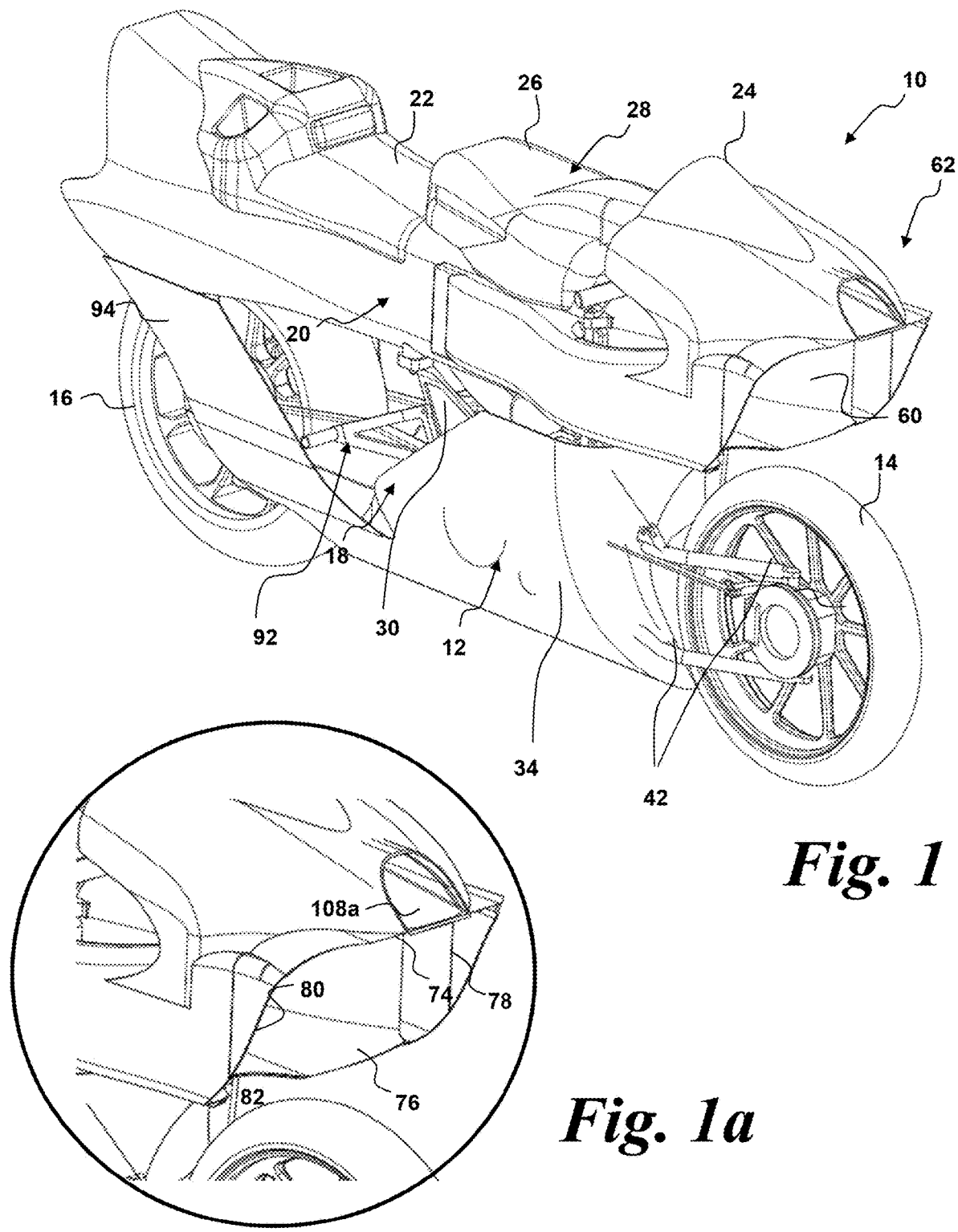
FIG. 1 is an isometric view of a motorcycle according to an embodiment of the present invention.
FIG. 1a is a magnified version of FIG. 1 showing the front portion of the motorcycle.

In embodiments, the motorcycle body and motorcycle is arranged to provide a significant improvement in aerodynamic drag when compared to a motorcycle of conventional design. The reduced aerodynamic drag can be utilised to provide a higher top speed for a given engine size and power output, or can be used to provide greater efficiency.

In embodiments, this improvement is achieved through a reduction in frontal area of the motorcycle. This results from the provision of a substantially unrestricted passageway through the centre of the motorcycle. However, additional air pressure control and airflow control elements are also able to reduce drag further, alter the centre of pressure, remove pressure build up at the nose of the motorcycle, generate downforce when required, and improve braking, acceleration and cornering performance as will be described.

Throughout the description and claims, the term motorcycle is intended to be non-limiting in terms of specific vehicle configuration. In the context of the present description, the term motorcycle is intended to refer to motor vehicles which are substantially open and driven by a rider straddling the motorcycle body or sitting on a seat and which may generally have two wheels but may alternatively have three wheels (two front, one rear or one front, two rear) or four wheels (two front, two rear). If more than two wheels are provided, the paired wheels may be structurally connected by a common axle or may be fully independent. In certain arrangements, it may be necessary for the wheels to tilt with the body of the motorcycle in use.

FIGS. 1 to 7 show different views of a motorcycle 10 according to an embodiment of the present invention.

The motorcycle 10 has a body 12, a front wheel 14 and a rear wheel 16. The body 12 may be formed in different ways. For example, the body 12 may comprise a frame with fairing panels for aerodynamic/aesthetic purposes, or the body 12 may be a monocoque structure or, as described in this embodiment, may comprise a combination of these components connected together. In this embodiment, the body 12 comprises two main elements—a base frame structure 18 and an upper body section 20. However, whilst these elements are described separately for clarity, they need not be separate elements and may be formed as a unitary chassis, or may comprise multiple parts connected together.

The body has a longitudinal centreline plane X-X (shown in FIGS. 3, 4, 6 and 7). The body 12 further comprises a seat 22 for a rider and a windshield 24. Located forwardly of the seat 22 is a raised portion 26 of the body 12 operable to contain a heat exchanger (described later) and, optionally, an energy supply unit 28 such as a battery (in the case of electric or hybrid power) and/or a fuel tank (in the case of ICE power).

Body Structure

The body structure of the motorcycle 10 comprises, in this embodiment, the base frame structure 18 and the upper body section 20. These main elements are separable from one another for replacement, repair or to interchange different sections. This is not possible with a conventional motorcycle design comprising a frame structure and non-structural fairings.

The base frame structure 18 comprises the necessary mechanical components (e.g. engine, suspension etc.) for the motorcycle 10. The upper body section 20 is at least partly structural and may be formed as a monocoque, for example, from carbon fibre. Alternatively, only a part of the upper body section 20 may be structural as described later.

The base frame structure 18 will now be described. The base frame structure 18 comprises a structural frame 30, a power unit 32 and a lower fairing 34. The structural frame 30 is a structural component, and in this embodiment the power unit 32 is also an integrated structural component. In this embodiment, the lower fairing 34 is a non-structural component. However, this is not intended to be limiting.

Figure 8:
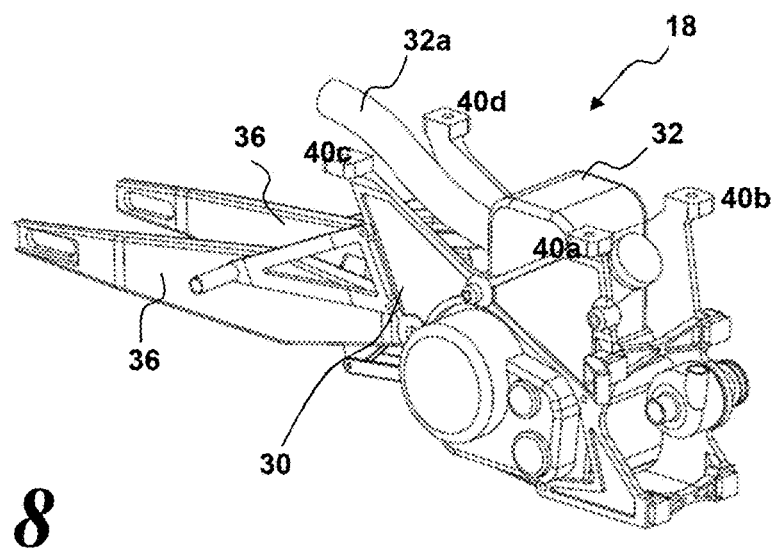
FIG. 8 is a view of a base structure separate from the remainder of the motorcycle of FIG. 1.
Figure 9A:
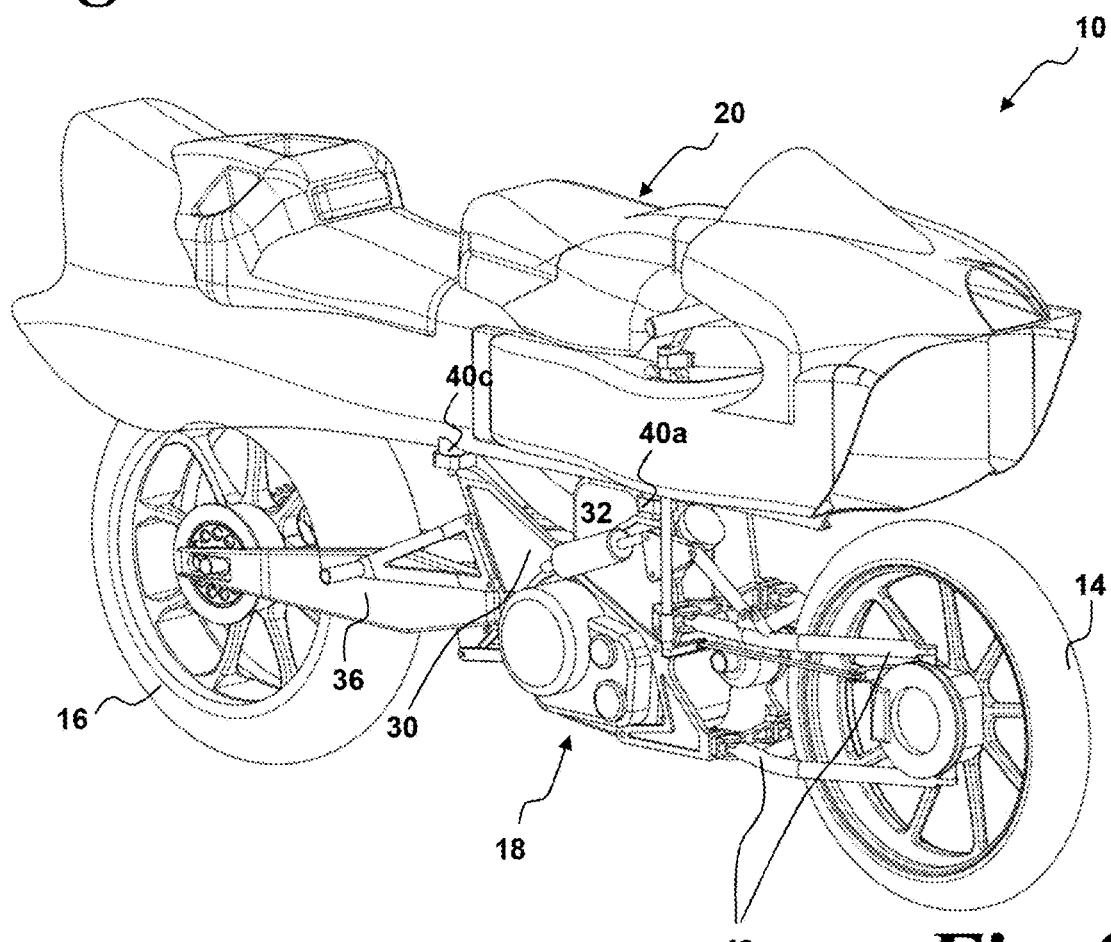
FIG. 9a is a view similar to FIG. 1 but with a lower cover removed.
Figure 9B:
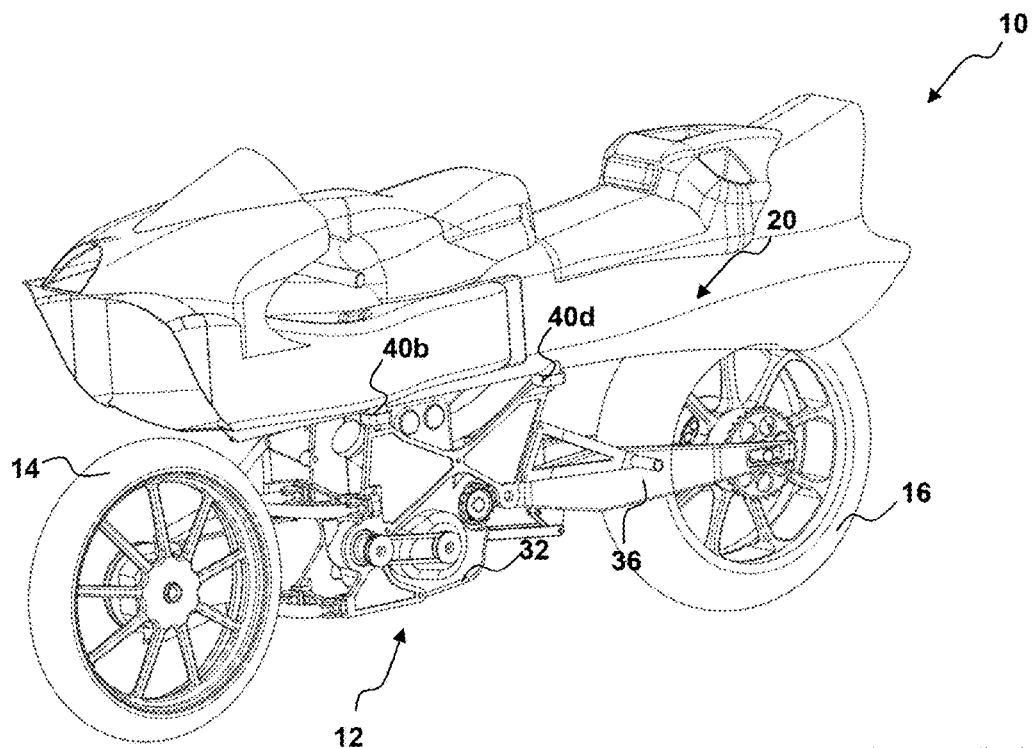
FIG. 9b is another view similar to FIG. 8 but with the cover removed.
Figure 9C:
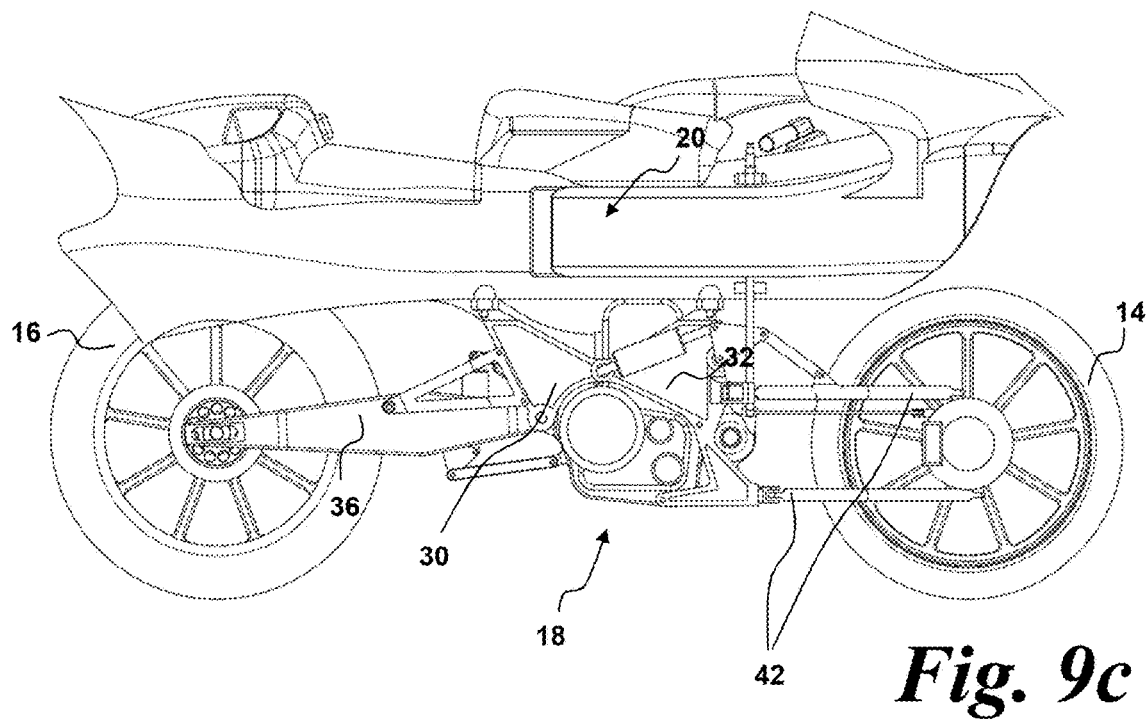
FIG. 9c is a side view with the lower cover removed.

The power unit 32 (shown in more detail in FIGS. 8 to 10) is located between the front and rear wheels 14, 16, and is arranged to drive the rear wheel 16 through a pair of rear swingarms 36 (best shown in FIG. 9a). The power unit 32 may take any suitable form, and may be an internal combustion engine (ICE) such as a piston engine or a rotary (Wankel) engine, an electric motor or a combination power source (e.g. a hybrid drivetrain with an ICE assisted by an electric motor).

If an ICE is used, it is desirable to use as small an engine as possible. A supercharged engine may be used, and the supercharger may be cooled by means of an intercooler which may form one of the radiator elements described later.

Alternatively, an engine rotated at 90 degrees (i.e. longitudinally mounted) may be used to reduce frontal area. As a further variation, a larger engine may be used with an air cooled cylinder block which may be arranged to project into the interior of the venturi aerodynamic duct (described later). Further variants will be apparent to the skilled person.

If an electric power source is used, then a centrally-mounted motor driving the rear wheel is preferable. However, in-wheel motors may be used within the rear and/or the front wheel hub in certain circumstances.

The core of the base frame structure 18 is shown separate from the motorcycle 10 in FIG. 8. As shown, the base frame structure 18 comprises all main components to support the power unit 32, for example power ancillaries such as ducting, fuel pipes and connections, and electronics. At the core of the base frame structure 18 is the power unit 32 which forms an integral structural element of the motorcycle 10. In this embodiment, the power unit 32 comprise a supercharged ICE and has an exhaust pipe 32a extending from the rear thereof.

The structural frame 30 is secured to the power unit 32 and comprises a pair of structural members formed either side of the power unit 32. The structural members define four mounting points 40a, 40b, 40c, 40d to which the upper body section 20 can be attached. The rear swingarms 36 are also connected to the structural frame 30.

FIGS. 9a, 9b, 9c and 10 show the motorcycle 10 with the base frame structure 18 connected to the upper body section 20 and with the lower fairing 34 removed. As shown, the body portion 20 is connected to the base frame structure 18 by means of the four mounting points 40a, 40b, 40c, 40d. The four mounting points 40a, 40b, 40c, 40d all lie in a common separation plane S-S (shown in FIG. 13) and so are arranged to mate to a substantially planar lower surface of the upper body portion 20. This defines the separation between upper and lower body portions along a substantially horizontal plane S-S which is perpendicular to the longitudinal centreline axis X-X.

However, this is not material to the invention and other securing arrangements and configurations may be used as appropriate, for example, additional or fewer mounting points may be provided, the mounting points may not lie in a common horizontal plane S-S perpendicular to the motorcycle longitudinal centreline X-X (e.g. the rear mounting points may be higher than the front mounting points and lie in a plane which is at an acute or obtuse angle to the centreline plane X-X). The skilled person would be aware of variations of this.

Figure 10:
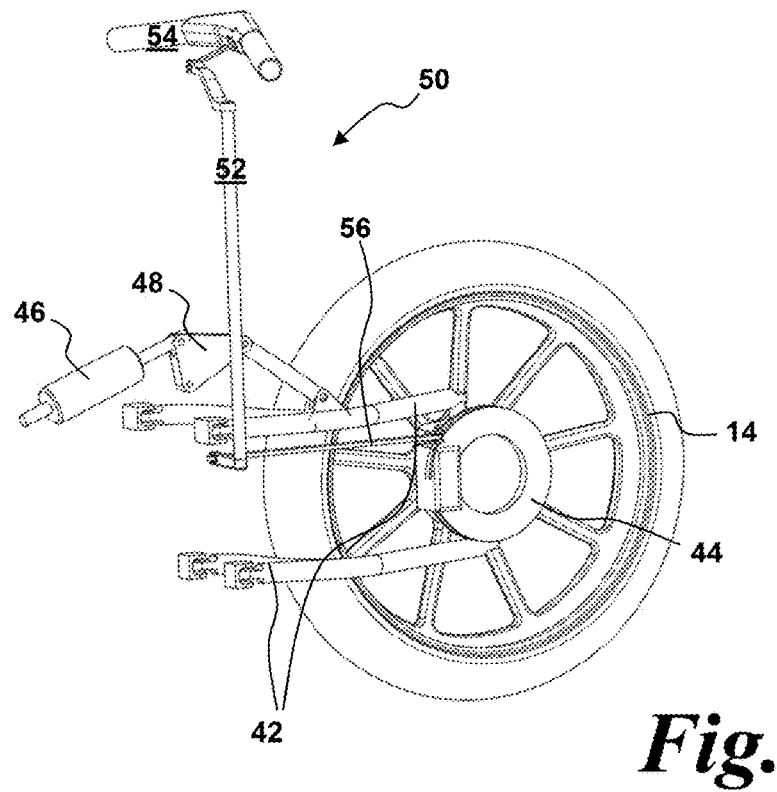
FIG. 10 is a view of a front wheel and steering arrangement shown separate from the remainder of the motorcycle of FIG. 1.

The front wheel support and steering mechanism will now be described. As shown in FIGS. 9 to 10, the front wheel 14 is connected to the base frame structure 18 by means of a pair of front wishbones 42 arranged on one side of the front wheel 14.

The steering mechanism is shown in more detail in FIG. 10. In FIG. 10, the front wheel support and steering mechanism is shown separate from the remainder of the motorcycle 10.

As described, the front wheel 14 is attached to the base frame structure 18 by a pair of substantially horizontal wishbones 42 arranged in a vertically stacked configuration which act as paired swingarms. Each of the front wishbones 42 connect to the base frame structure 18 at one end and to a central front wheel hub 44 at the other end. The front wishbones 42 are connected to the front wheel hub 44 by means of a rotating kingpin connection to enable the front wheel to be rotated about a plane perpendicular to the rotational axis of the wheel to enable the motorcycle 10 to be steered in use.

A suspension damper 46 is connected via a pullrod linkage 48 which extends between the structural frame 30 and the upper pair of front wishbones 42. The use of this type of fork-less arrangement has improved aerodynamic properties (as will be described above) and, further, the swingarm arrangement does not suffer from issues of dive, squat or stiction which can affect front fork-equipped designs. Further, the body structure can be made lighter and the steering can be isolated from braking and acceleration forces.

Steering is effected by means of a pushrod steering arrangement 50. A push-pull rod 52 is connected to handlebars 54 through a right angle joint to a connection arm 56 pivotably connected to the wheel hub 44. However, other arrangements could be used with the present invention; for example, hub-centre arrangements. In some circumstances, conventional forks could be used but these are less preferred due to the poorer aerodynamic properties. However, if front forks are sufficiently and necessarily widely spaced (in, for example, a motorcycle arrangement having two spaced front wheels), then front forks may be effective.

As shown in FIGS. 8 to 10, the arrangement of the present embodiment enables a separation between the main powertrain, steering and suspension components and the upper body section 20. In other words, the base frame structure 18 comprises all the necessary elements for operation of the motorcycle, save for the fuel source, heat exchangers and headstock/handlebars 54.

This enables a modular construction of the motorcycle 10. Given the structural independence of the lower base frame structure 18 and the body portion 20, the body portion 20 can be easily interchanged for a different structure and shape, or easily replaced in the event of damage. By providing an upper section 20 of the motorcycle 10 which extends from the front of the motorcycle 10 to the rear, ease of construction, repair and modification is possible.

Further, this arrangement the body portion 20 to be shaped and dimensioned for optimal aerodynamic or packaging requirements without the restraints of incorporating drivetrain components.

Referring to FIGS. 1 to 10, the structure of the upper body section 20 will now be described. The upper body section 20 forms part of the external surface of the motorcycle 10 and is at least in part structural. As described above, the entire upper body section 20 may be formed as a single monocoque in which structural loads pass through the external surfaces of the upper body section 20.

However, this need not be the case. Whilst the upper body section 20 comprises the entire upper section of the motorcycle 10, only specific elements are required to be structural. For example, the upper body section 20 may comprise a central structural unit which includes the minimum of required structural components. A non-limiting and non-exhaustive list of these components would be: the headstock, the seat 22 and the mounting sections arranged to be connected to the mounting points 40a, 40b, 40c, 40d of the base frame section 18. A central structural element of the upper body portion 20 may include these elements with other areas of the upper body section 20 (e.g. the front and rear portions) may be non-structural fairing-type structures. This would allow easier replacement in the event of damage.

Such a modular construction is not possible with a conventional motorcycle and conveys numerous advantages.

Venturi Duct Arrangement

The upper body section 20 of the motorcycle body 12 defines a venturi duct 58 therethrough. This is shown schematically in FIGS. 11 and 12 and in detail in FIGS. 13 to 16.

The venturi duct 58 extends continuously from the front of the motorcycle 10 through to the rear of the motorcycle 10. At a general level, the venturi duct 58 comprises a substantially unrestricted and open passageway or elongate duct extending directly through the centre of the motorcycle 10 from a front portion of the body 12 to a rear portion of the body 12. The venturi duct 58 comprises an intake 60 at a front portion 62 of the body 12 and an outlet 64 at a rear portion 66 of the body 12.

A purpose of the venturi duct 58 is to reduce the frontal area of the motorcycle 10. This is because the drag force $F_d$ on a moving object in a fluid such as air is proportional to the frontal area of the object and the drag coefficient $C_d$ of the object as set out in equation 1) below:

$$F_d = \tfrac{1}{2} C_d \rho v^2 A \quad\quad 1)$$

Where $F_d$ is the drag force, $C_d$ is the coefficient of drag, $\rho$ is the density of air, $v$ the velocity and $A$ the frontal area of the object.

In general, the frontal area A of a vehicle is the orthographic projection of the vehicle on a plane perpendicular to the direction of motion. For a motorcycle under steady-state, straight-line conditions, the direction of motion D along a ground surface R will generally by coincident with the longitudinal centreline plane X-X of the motorcycle 10 and so the frontal area A of the motorcycle 10 can be considered to be the frontal area measured in a plane perpendicular to the centreline plane X-X. The longitudinal centreline plane X-X is shown in FIGS. 3, 4, 6 and 7.

Figure 11:
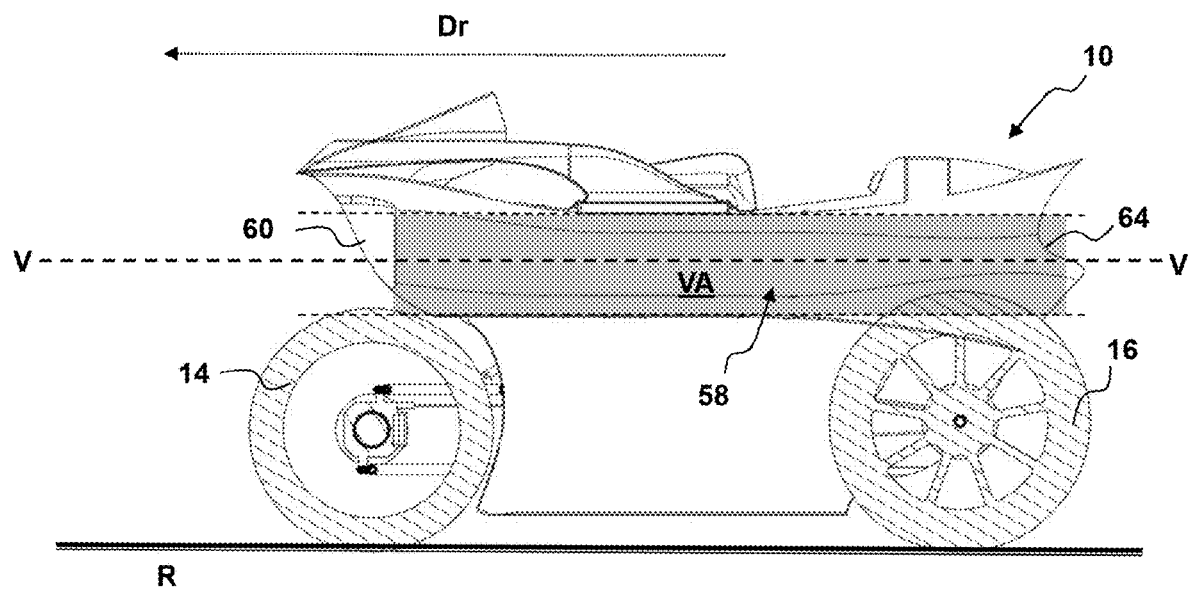
FIG. 11 is a simplified side section view showing the frontal area reduction of the motorcycle according to an embodiment.
Figure 12:
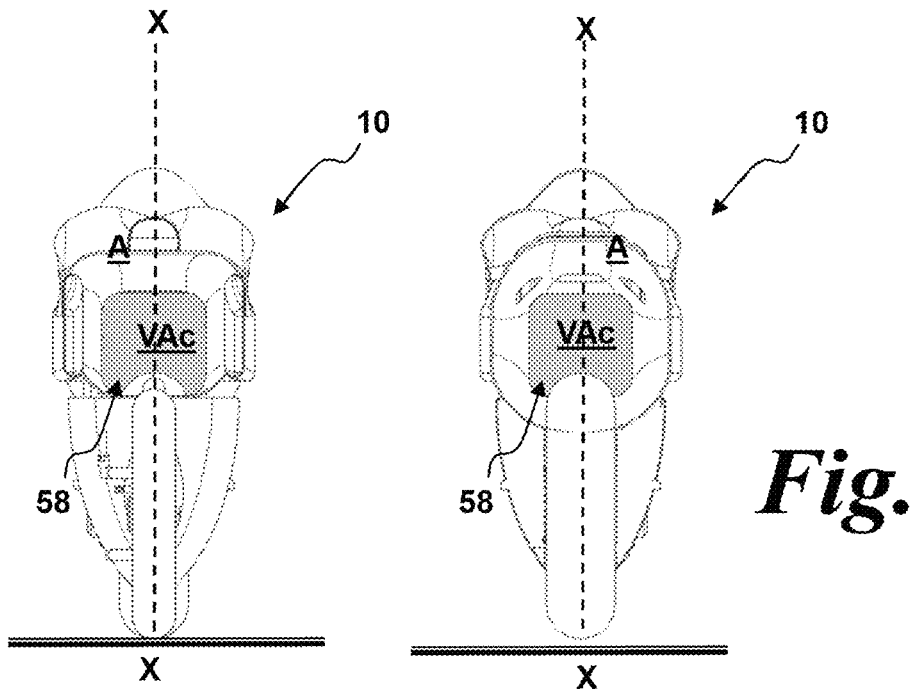
FIG. 12 shows simplified front and rear views of the motorcycle according to an embodiment showing the reduced frontal area.

By providing a substantially open channel through the centre of the motorcycle 10, it is possible to significantly reduce the frontal area of the motorcycle 10. FIG. 11 shows a simplified side section view of the motorcycle 10 (more detailed side section views are shown in later figures). FIG. 12 shows simplified front and rear views, similar to FIGS. 3 and 4 but highlighting the open area of the venturi duct 58.

As shown in FIG. 11, the venturi duct 58 extends along an axis V-V which is substantially parallel to the longitudinal centreline plane X-X. In normal, straight-line motion conditions, the axis V-V is also substantially parallel to the direction of motion D of the motorcycle 10 and, therefore, substantially parallel to the direction of the oncoming airflow (assuming the absence of a crosswind).

The shaded region in FIG. 11 shows schematically a substantially unobstructed and open region VA of the venturi duct 58 when viewed along the centreline plane X-X and parallel to the axis V-V. The unobstructed region VA is delimited by the narrowest section of the venturi duct 58, which is at the centre as will be described in more detail later. In other words, the region VA comprises an elongate channel or duct having a longitudinal and cross-sectional profile such that a line drawn in this region parallel to the axis V-V will not contact any portion of the motorcycle 10.

The shaded region VA is also shown in FIG. 12. As shown, the region VA has a substantially rectangular cross-section VAc defined by the cross-sectional area of the central region of the venturi duct 58.

The cross-sectional area VAc is defined, in part, by the positional relationship between the intake 60, the venturi duct 58 and the outlet 64 with respect to the longitudinal centreline plane X-X. In other words, to minimise the frontal area A (and concomitantly maximise the cross-sectional area VAc) then the intake 60 and outlet 64 are required to be aligned in the direction of the longitudinal centreline plane X-X and the axis V-V of the venturi duct 58 is required to be parallel to the longitudinal centreline plane X-X.

In other words, in order to reduce the frontal area A of the motorcycle 10, it is required that there is a line of sight between the intake 60 and the outlet 64 through the venturi duct 58, preferably in the direction of the longitudinal centreline plane X-X. The greater the overlap between the intake 60 and the outlet 64 in the relevant plane when viewed in the relevant direction (in this case, the plane X-X), the larger the value of the cross sectional area VAc of the unobstructed region VA and so the greater the reduction in frontal area A.

It is noted that the front and rear wheels 14, 16 impinge slightly into the region VA in normal use. This is, in embodiments, arranged as a trade-off between overall size and area of the venturi duct 58, the height of the venturi duct 58 above the ground and the height of the motorcycle 10.

However, the amount by which the front and rear wheels 14, 16 impinge into the region VA will of course vary in use depending upon the loads on the front and rear wheels and movement of the wheels 14, 16 relative to the chassis in use; for example, during braking, acceleration, cornering or other situations where the suspension is under variable loads. When considering frontal area, the orthographic projection of the frontal area in a direction of motion would of course mean that the impingement of the front and rear wheels 14, 16 would reduce the cross-sectional area VAc of the venturi duct 58 and increase the frontal area A. However, the ultimate effect of this on the total drag is more complex due to the limited projections of the wheels in certain regions of the motorcycle 10 and the effect of airflow through the venturi duct 58.

As shown particularly in FIG. 12, the substantially open venturi duct 58 having an orthographic cross-sectional area VAc reduces the frontal area A of the motorcycle 10 considerably. In embodiments, the reduction of frontal area A may be in the region of 10-40%, and generally in the range of 15-30% when compared to a similar motorcycle without a venturi duct 58 or with the venturi duct 58 closed off.

In other words, the ratio of A/(VAc+A) may typically be in the range of 0.7-0.85. As set out in equation 1), this will reduce the drag force on the motorcycle 10 by a corresponding amount, before any of the further aerodynamic benefits of the shape are considered.

As set out above, by reducing the frontal area of the motorcycle 10 by an amount equal to the dimensions of the cross-section of the venturi duct 58 (for example, at the narrowest point of the venturi), the drag force $F_d$ is correspondingly reduced.

In addition, the provision of a more aerodynamically efficient shape with lower pressure build up may also have an effect on the coefficient of drag $C_d$. For example, the different form of the motorcycle 10 with a venturi duct 58 present may lead to reduced form drag or parasitic drag, reducing the $C_d$ of the design. For example, the presence of the venturi duct 58 changes the central frontal shape of the motorcycle 10 from a relatively wide blunt structure to two narrow, high aspect ratio side walls separated by the venturi duct 58. These side walls may have more favourable aerodynamic properties than a wide blunt nose shape as found in conventional motorcycles.

In addition to reducing the total frontal area of the motorcycle 10, the venturi duct 58 can be utilised to provide aerodynamic benefits. For example, a key region of pressure build up for a motorcycle at speed is a region of the nose of the motorcycle above the front wheel. By use of a venturi duct 58, air is accelerated through the interior of the venturi duct 58, creating a region of lower pressure in the intake 60.

Indeed, the skilled person would appreciate that the aerodynamic benefits of the use of the venturi duct 58 may be advantageous even without a significant reduction in the frontal area A.

This may be the case if, for example, instead of a single central intake 60 as described above, a pair of laterally or vertically offset intakes are provided. This may be necessary in cases where it is not possible to provide a central intake; for example, where legal requirements demand a headlight or other item to be located centrally.

Additionally or alternatively, a pair of laterally or vertically offset outlets may be provided instead of a central outlet if, for example, it is necessary to provide items in the central tail region (e.g, tail lights or exhaust components). As a further alternative, a single intake and/or outlet may be provided but the intake(s) and outlet(s) are offset vertically and/or laterally with respect to one another. The venturi duct 58 may then have one or more curved sections.

As a further alternative, there may be line of sight between the intake and the outlet through the venturi duct 58, but the venturi duct 58 may have an axis V-V which is parallel to the longitudinal centreline plane X-X but at an angle to the road surface or direction of travel. This may occur if, for example, there is a particular rake on the motorcycle 10 with respect to the ground surface.

These alternatives would not, in contrast to the example described above, minimise the total frontal area A because there would less (or no) overlap between the intake and outlet regions when viewed in the relevant plane. However, in situations where such overlap is not possible (e.g. due to packaging constraints), there may still be significant advantages to the use of a venturi duct 58.

The venturi duct 58 is made possible and practical by competing constraints on motorcycle design. Firstly, it is necessary to provide a seat for a rider at a sufficient height above the ground to enable the rider to lean into corners. If the rider is sat at too low a height, then the rider will have insufficient a moment arm to lean the motorcycle in a corner. However, this is contrary to the general desire to reduce frontal area of a motorcycle to reduce drag.

By providing a substantially open passageway through the centre of the motorcycle chassis extending longitudinally between the front and rear wheels and extending vertically between the seat 22 for the rider and the power unit 32, both of these issues can be addressed. The venturi duct 58 reduces the frontal area, whilst still maintaining the seat 22 at a height suitable to enable a rider to control the motorcycle as desired.

Figure 7:
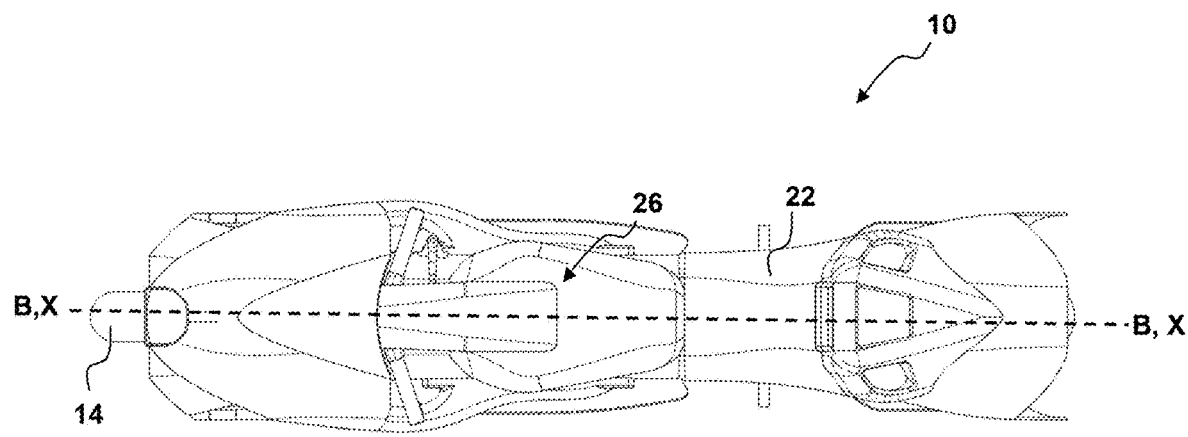
FIG. 7 is a plan view of the motorcycle of FIG. 1.
Figure 13:
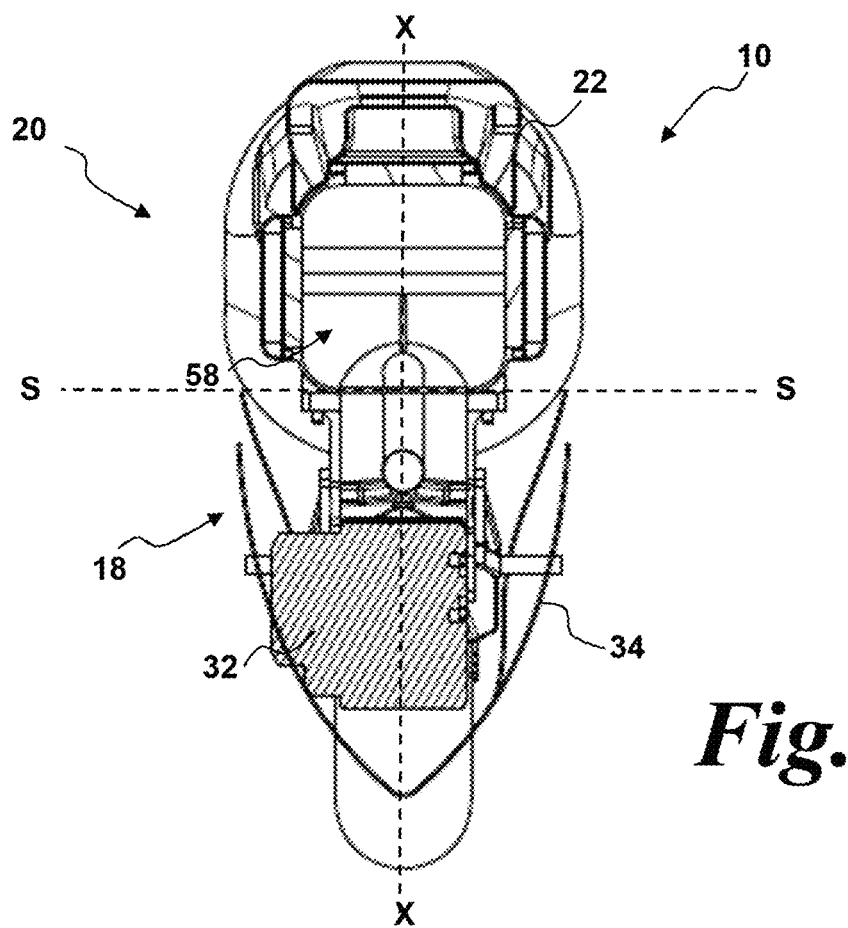
FIG. 13 is a front section view taken along the plane A-A of FIG. 5.
Figure 14:
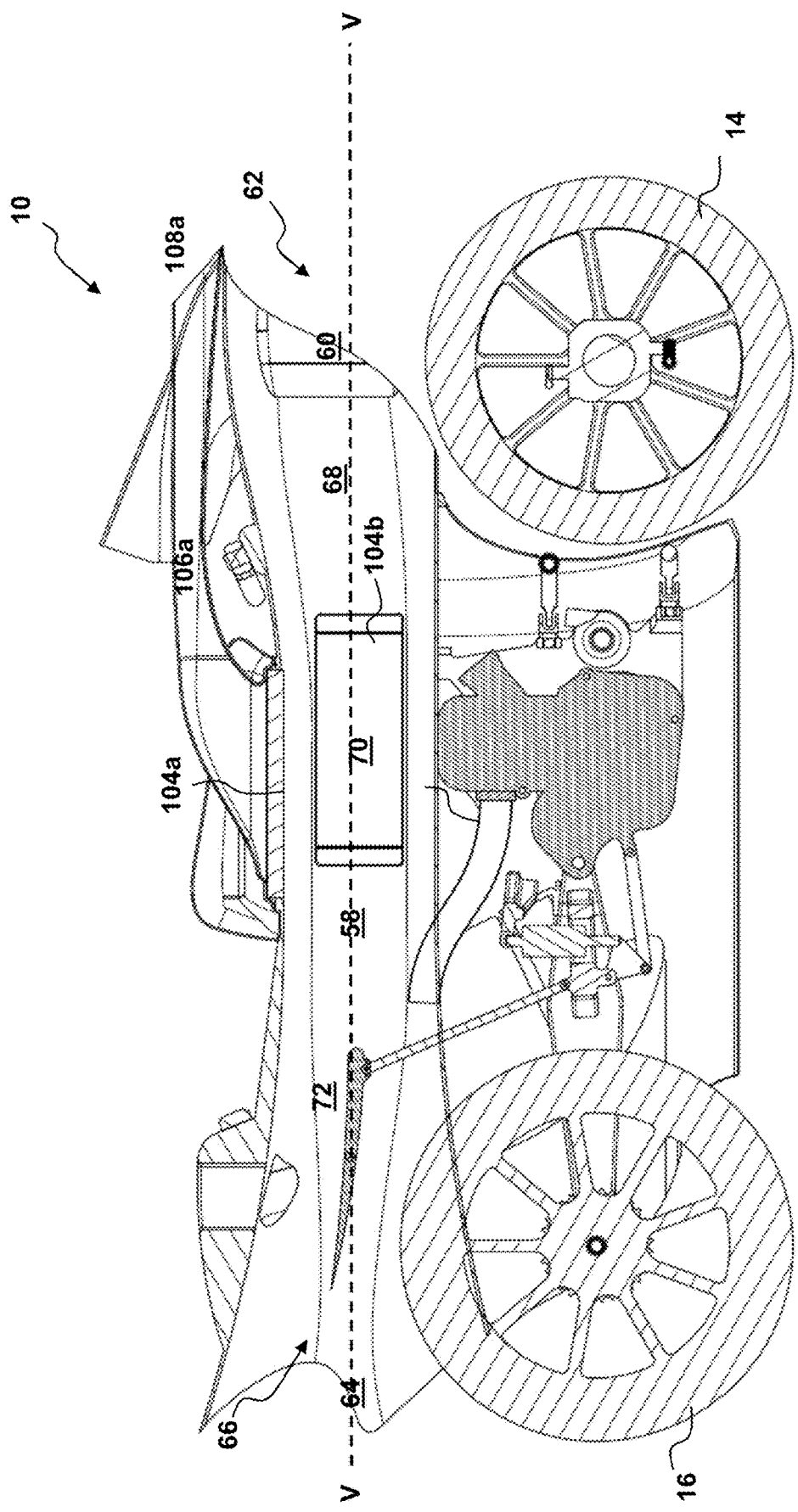
FIG. 14 is a side section view taken along the plane B-B of FIG. 7.
Figure 15:
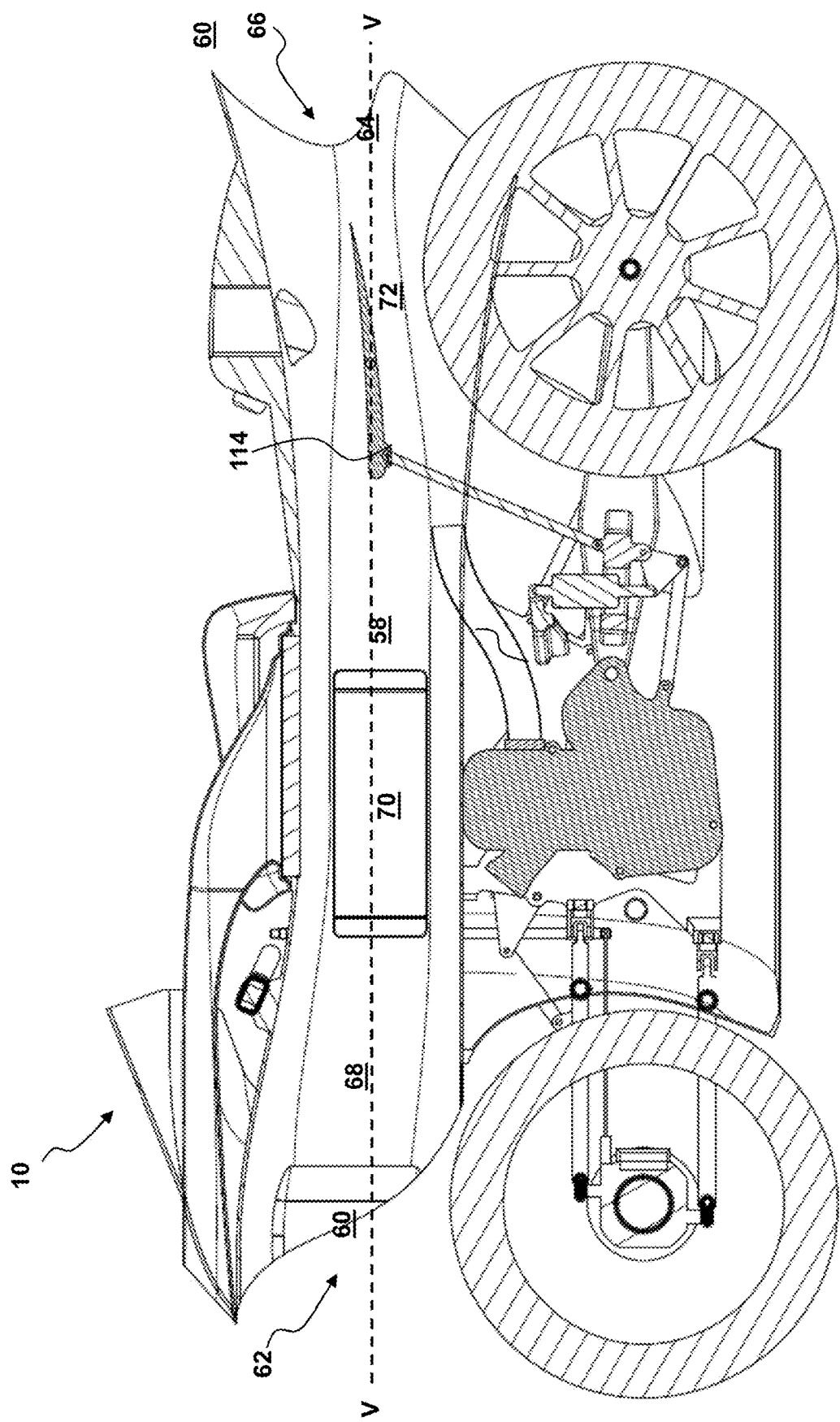
FIG. 15 is another side section view taken along the plane B-B of FIG. 7.
Figure 16:
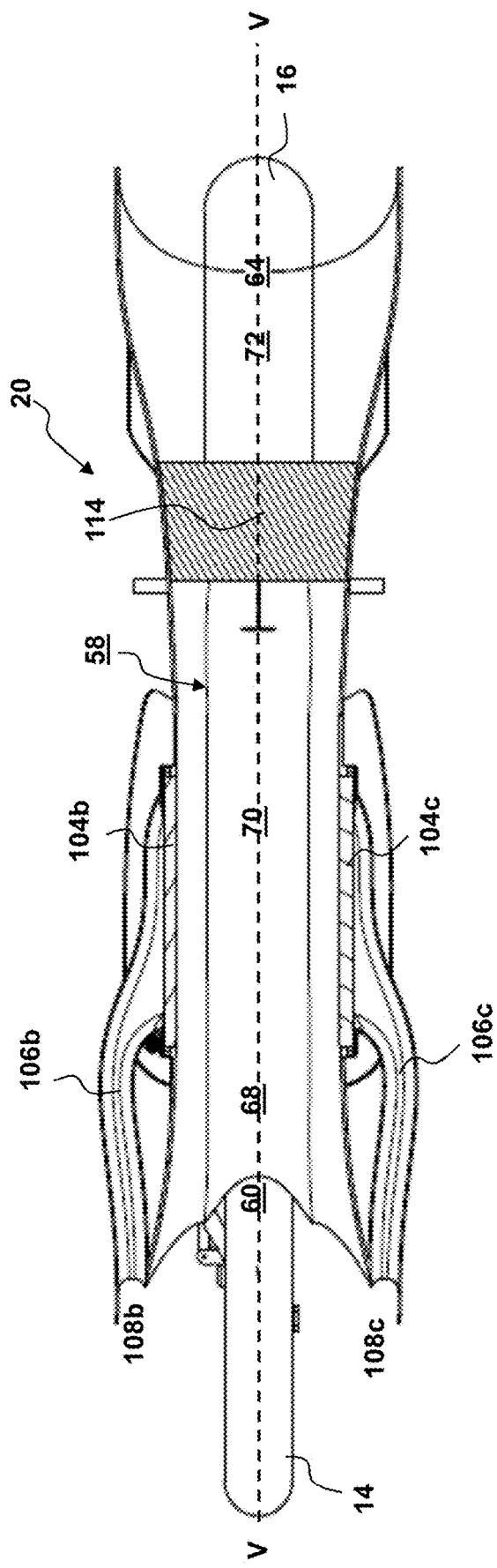
FIG. 16 is a plan section view taken along the plane C-C of FIG. 5.

FIGS. 13 to 16 show a selection of views of the venturi duct 58 in more detail. FIG. 13 shows a front section view side section view through the centre of the venturi duct 58 taken along plane A-A of FIG. 5. FIGS. 14 and 15 show a side section view of the motorcycle 10 taken along plane B-B of FIG. 7 and FIG. 16 shows a plan section taken along plane C-C shown in FIG. 5.

As shown in FIGS. 13 to 16, the venturi duct 58 extends through the centre of the body 12 extending from the intake 60 to the outlet 64. The venturi duct 58 has an intake portion 68, a central portion 70 and a diffuser portion 72.

The central portion 70 has a smaller cross-sectional area than the intake and outlet portions 60, 64 thereby creating a venturi flow section. In other words, the cross-sectional area of the venturi duct 58 reduces from the intake 60 to the central portion 70 and then increases through the length of the diffuser portion 72 to the outlet 64.

Airflow entering the intake 60 will pass through the intake portion 68 into the central portion 70 and will be accelerated due to the reducing cross-sectional area from the intake 60 to the central portion 70, before slowing in the diffuser portion 72 as the cross-sectional area increases from the central portion 70 to the outlet 64. The acceleration of the airflow into the central portion 70 creates a pressure gradient between the central portion 70 and the intake 60, which reduces the pressure at the front of the motorcycle 10 when in motion.

In embodiments, the venturi duct 58 is formed integrally with the upper body section 20 of the body 12. In other words, the upper body section 20 of body 12 is formed as a monocoque and the venturi duct 58 is defined as part of the body 12. However, other arrangements may be utilised. As described above, the upper body section 20 may comprise a central structural monocoque (which may extend from the headstock to the seat 22 and include connection points at a lower surface to connect to the mounting points 40a, 40b, 40c, 40d) with non-structural fairings at the front and rear.

For example, the parts of the upper body section 20 defining the intake portion 68 and/or diffuser portions 72 may be formed as non-structural fairings. This enables straightforward replacement in the event of damage, and allows greater freedom of materials and structures. For example, the parts of the upper body section 20 defining the intake portion 68 and/or diffuser portions 72 may be formed from transparent or translucent materials such as polycarbonate, or formed from cheaper non-structural materials such as GRP.

Whilst cooling ducts and channels are well known in motorcycle design, the inventor of the present application has discovered, for the first time, that provision of such a large substantially open duct extending directly between the front and the rear of the motorcycle 10 between the front and rear wheels 14, 16 can lead to significant efficiency and aerodynamic advantages for motorcycle design, leading to improved performance.

In embodiments, the venturi duct 58 is arranged to have a minimum cross-sectional area (i.e. in the central region where the duct is narrowest) in the range of 10,000 mm$^2$ (0.01 m$^2$) to approximately 90,000 mm$^2$ (0.09 m$^2$). In addition, it is desired that the intake portion has a cone angle of between 1° and 10°, and a diffuser portion having a cone angle between 1° and 10°. By this is meant that the angle of each surface of the intake portion relative to the centreline is within this range. Therefore, the total angle between the (for example) upper and lower surfaces of the intake portion should be in the range of 1° to 20°. However, these dimensions and configurations are exemplary and may be varied as appropriate.

Detailed Structure of Venturi Duct

The structure of the venturi duct 58 will now be described with reference to FIGS. 1 to 16.

As shown in FIG. 1a, the intake 60 is delimited by the upper body portion 20, which forms upper 74, lower 76 and side 78, 80 walls defining the intake portion 68. The intake 60 is broad and substantially rectangular in shape, and forms a significant portion of the front region of the motorcycle 10. In this embodiment, the intake 60 is slanted forwardly so that the upper wall 74 extends forwardly of the lower wall 76. The walls 74, 76, 78, 80 are substantially flat and slab-sided.

The intake 60 is located adjacent the front wheel 14. The base of the intake 60 is located approximately level with and offset to the rear of the axis of rotation of the front wheel 14. This is shown best in FIGS. 1, 1a, 3 and 5, where the lower wall 76 of the intake portion 68 is at a lower height than the top of the front wheel 14. This arrangement allows laminar air to flow into the intake 60 whilst the turbulent air from the front wheel 14 is arranged to pass around the lower cover (described later).

Figure 3:
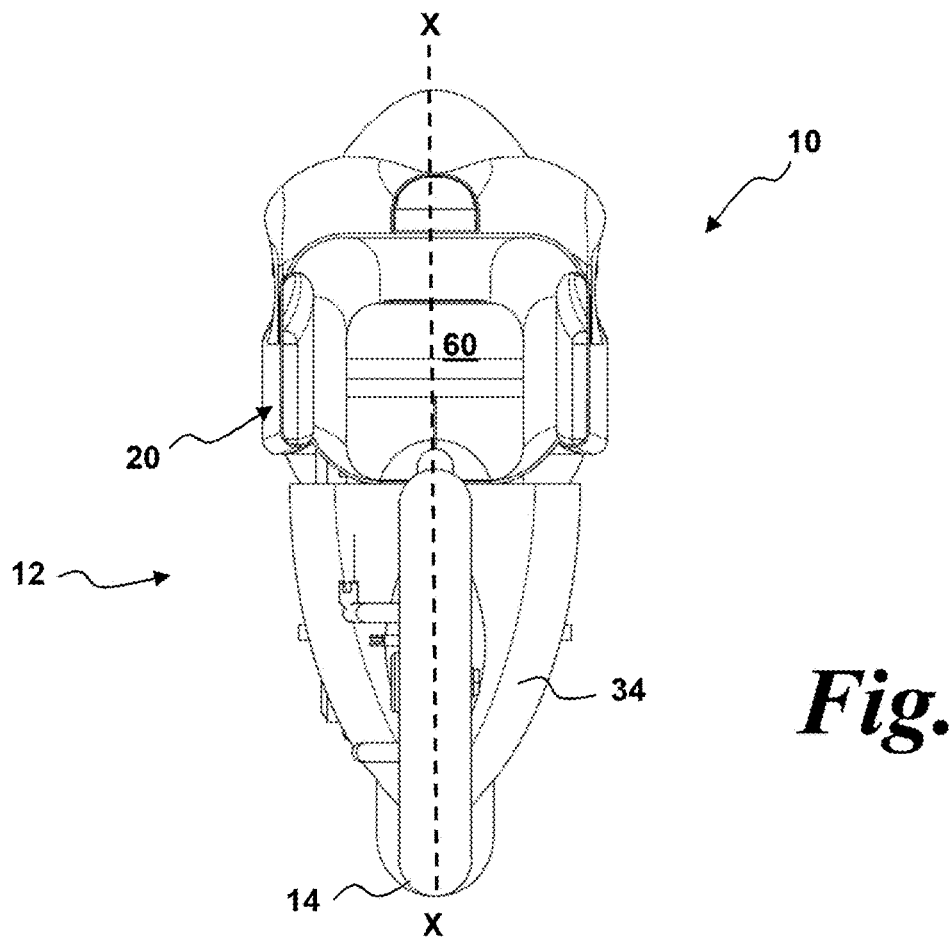
FIG. 3 is a front view of the motorcycle of FIG. 1.
Figure 4:
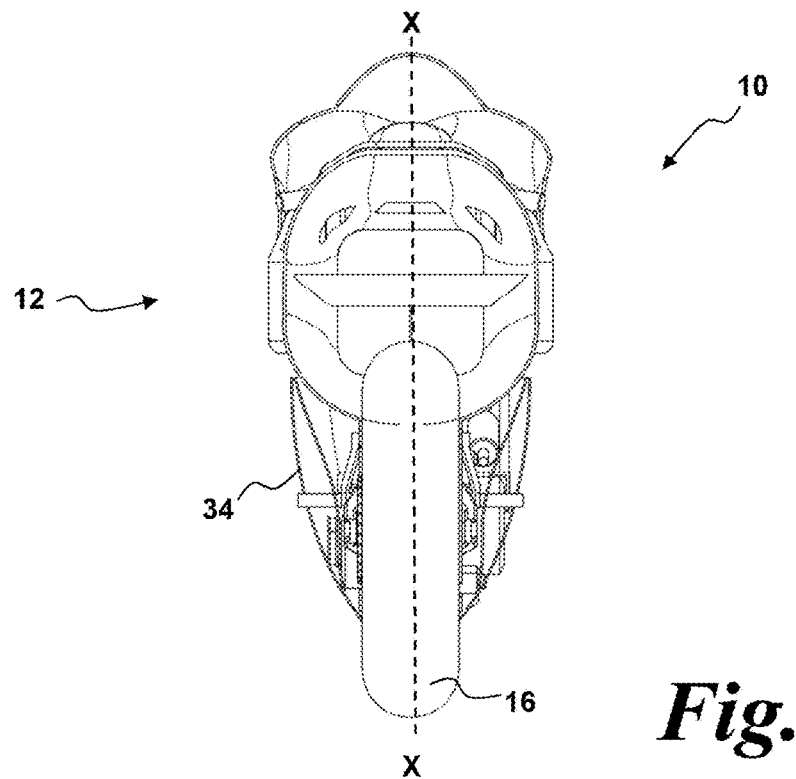
FIG. 4 is a rear view of the motorcycle of FIG. 1.
Figure 5:
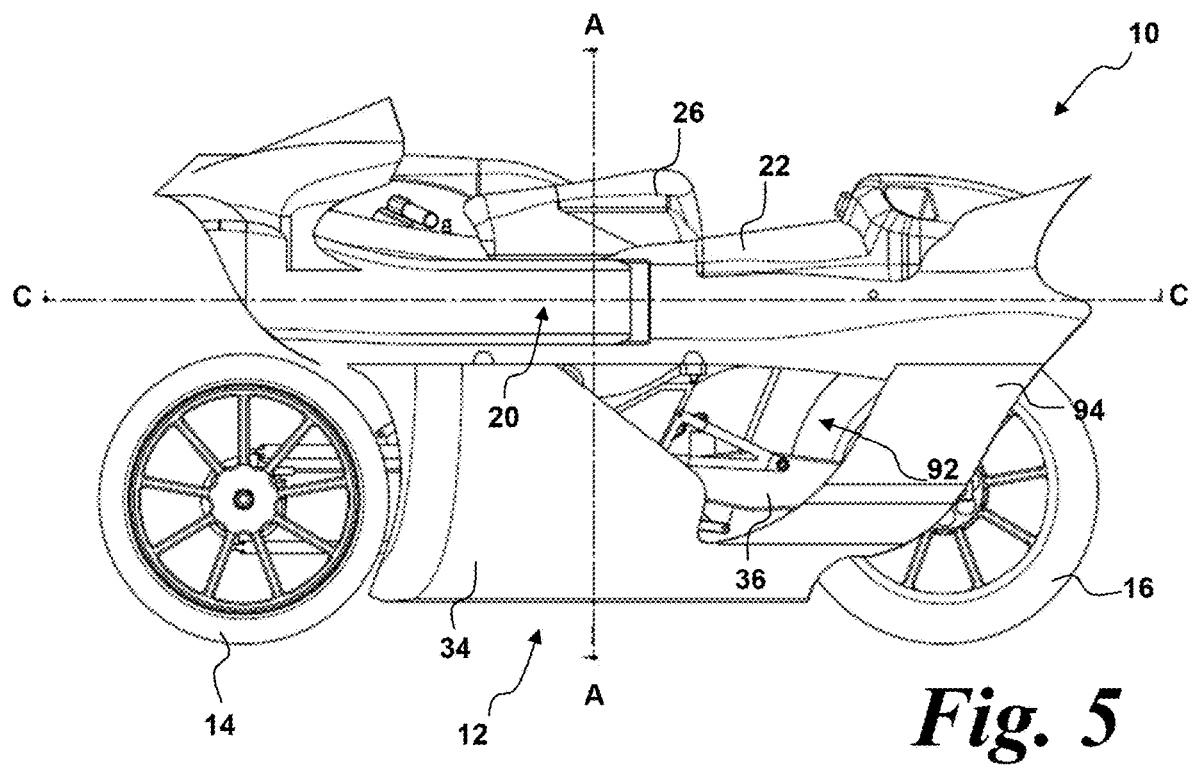
FIG. 5 is a side view of the motorcycle of FIG. 1.

As shown in FIG. 3, when viewing along a longitudinal axis of the motorcycle 10, the uppermost portion of the tyre of the front wheel 14 extends slightly into the region defining the intake 60. The lower wall 76 of the intake 60 has a cut-out 82 formed therein (see FIGS. 1a and 15) in the region of the rearmost portion of the lower wall 76.

This is to provide room for the front wheel 14 to move in use; for example, to provide space for suspension travel when under braking, load or cornering, and to allow space for the front wheel 14 to turn to enable steering of the motorcycle 10.

Ideally, it is desirable to isolate the intake 60 entirely from the turbulent air generated by movement of the front wheel 14 to ensure that the air entering the venturi duct 58 is as laminar as possible. An alternative is, for example, to locate the venturi duct 58 higher on the motorcycle and/or to provide a lower splitter (not shown) between the front wheel 14 and the intake 60. As a further alternative or addition, a fairing or hugger structure can be added to the front wheel to deflect airflow.

However, a trade off is necessary to achieve usability and performance. In the present embodiment, whilst the uppermost portion of the front wheel 14 impinges into the area defined by the inlet 60, this enables the inlet 60 to be larger and therefore reduce the frontal cross sectional area of the motorcycle 10. Further, because of the provision of the cut-out 82, under front suspension load (e.g. under braking or large undulations in the road surface) the front wheel 14 may briefly impinge into the region defined by the intake 60.

However, for a large proportion of the time the motorcycle 10 is being ridden the front wheel 14 is further away from the intake 60 and the venturi 58 may be more effective. In any event, the disruption of the airflow into the venturi 58 and intake 60 under braking may be beneficial in creating additional drag to slow the motorcycle 10 down.

In addition to the above, the lower wall 76 of the inlet 60 defines a small splitter which is operable to block and/or deflect a proportion of the air carried upwards with the front wheel 14 when the motorcycle 10 is in motion.

The lower fairing 34 is shaped and arranged to assist with this. The lower fairing 34 is arranged to cover the base frame structure 18 to provide environmental protection for lower components of the motorcycle 10 and to improve aerodynamic efficiency of the motorcycle 10. The lower fairing 34 has, in general, three main functions: to ease the turbulent air created by the front wheel 14 around the remainder of the motorcycle 10, to house the power unit in an aerodynamic fairing to provide an efficient fairing to house the rider's legs from the upper part to the lower part of the motorcycle 10. As shown best in FIGS. 2, 3 and 6, the lower fairing 34 has a substantially boat-shaped hull which has a curved V-shaped cross-section with a single chine 84 and curved sides 86. In other words, the cross-section tapers to a point at a lowermost end of the lower fairing 34 in a vertical direction.

Figure 6:
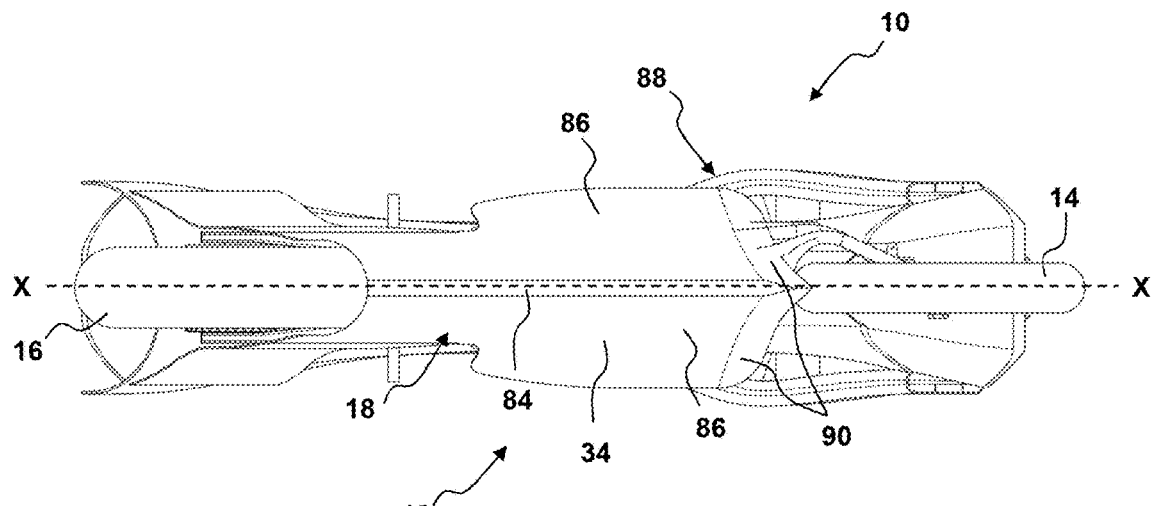
FIG. 6 is an underneath view of the motorcycle of FIG. 1.

The front portion 88 of the lower fairing 34 has a generally bow-shaped configuration. The front portion 88 tapers outwardly from a point adjacent the rear of the front wheel 14 to form a V-shape in plan view. This is best shown in FIG. 6. In other words, the front portion 88 comprises two rearwardly-angled panel sections 90 which are arranged in use to deflect oncoming air and air from the front wheel 14 in either side of the centreline of the motorcycle 10 and around the sides of the motorcycle 10. By deflecting oncoming air smoothly around the sides of the motorcycle 10, this reduces the backflow of turbulent air into the intake 60.

The lower fairing 34 extends rearwardly from the front portion 86 to cover the power unit 32. An aperture 92 (FIGS. 1 and 5) is formed in each side 86 to enable components such as footrests to extend from the base frame structure 18 and to provide space for a rider to tuck his/her lower limbs into. Finally, two side flanges 94 are provided which extend rearwardly of the rider position and join to the lower surface of the body portion 20 at the rear of the motorcycle 10. The side flanges 94 assist in preventing breakaway of airflow passing downstream of the rider's legs and thus help reduce turbulence and drag.

Further elements may be used in and around the lower cover. For example, bargeboards or other aerodynamic devices (not shown) may be located forwardly of and adjacent the lower fairing 34 to define a narrow duct therebetween. The high flow speed of airflow through such a narrow duct may be utilised for aerodynamic benefit; for example: to mitigate boundary layer stagnation; to reduce form drag by reducing turbulent wake downstream of the front portion 86 of the lower cover; and to guide airflow around the rider's legs.

In addition, if an ICE engine is provided, it is necessary to provide an inlet aperture to an airbox of the ICE. The engine inlet aperture may be located in any suitable location; for example, formed in a lower wall of the venturi duct 58, or located between the intake 60 and the lower fairing 34. The location may be arranged in a region of higher pressure such that the intake pressure into the ICE is increased, providing an increase in induction pressure.

As shown, the venturi outlet 64 is located at the rear of the motorcycle adjacent the rear wheel 16. The venturi outlet 64 is delimited by a rear portion of the duct body 20 which forms the diffuser portion 72 of the venturi duct 58. The diffuser portion 72 forms an irregular diffuser cone expanding outwardly towards the rear of the motorcycle 10 in the region adjacent and rearwardly of the seat 22.

However, whilst the outlet 64 is shown as having a substantially irregular cross-section, this need not be the case and any suitable shape may be used; for example, the outlet 64 and/or diffuser portion 72 may take any suitable cross-sectional shape such as circular, ovoid or rectangular.

Figure 2:
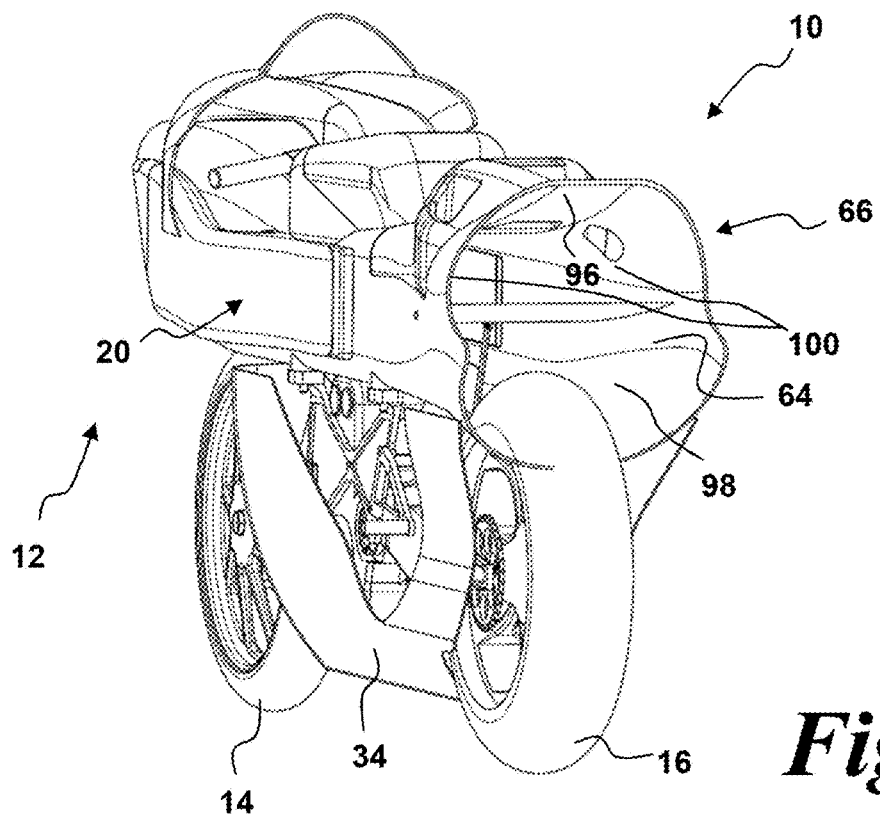
FIG. 2 is a rear isometric view of the motorcycle of FIG. 1.

Turning to the diffuser portion 72 in more detail (FIG. 2), the diffuser portion 72 comprises an upper wall 96, a lower wall 98 and sidewalls 100. As shown in FIG. 2, a portion of the rear wheel 16 extends into the space defined by the diffuser portion 72. In addition, the rear wheel 16 extends into the outlet 64 itself. In embodiments, the rear wheel 16 rotates within a cut out 102 formed in the lower wall 60.

This arrangement has notable benefits. Firstly, the airflow generated by rotation of the rear wheel 16 is at least partly counteracted by the flow through the diffuser portion 72 and outlet 64. This reduces drag occurring from the substantially vertically moving airflow from the rear wheel 16.

Secondly, and with reference to FIG. 8, in the case where the power unit 18 comprises an internal combustion engine, an exhaust pipe 32a of the internal combustion engine may exhaust into the diffuser portion 72 of the venturi duct 58. This has the additional benefit of providing increased flow into the diffuser portion 72 of the venturi duct 58, causing yet further acceleration of air through the venturi duct 58 and assisting in drawing airflow from front of the motorcycle 10 into the venturi duct 58. A metal heat shield (not shown) may optionally be placed downstream of the exhaust pipe 32a in front of the rear wheel 16 to protect the rear wheel 16 from the thermal load of the exhaust gases and to deflect the exhaust gases.

By providing such an arrangement, the airflow from the rear wheel 16 and exhaust pipe 32a is achieved to achieve higher efficiency of the venturi duct 58. As shown in FIG. 7, the exhaust gases will also be diluted by the airflow through the venturi duct 58. This will have the effect of cooling the exhaust gases, reducing the thermal load on components of the motorcycle 10 downstream of the exhaust 32a and reducing noise output from the exhaust 32a.

However, the arrangement need not be as shown. The skilled person would readily understand that variations could be made which would fall within the scope of the present disclosure. For example, the rear wheel 16 need not project into the diffuser portion 72 of the venturi duct 58 and maybe separated there from, for example by the lower wall 98.

Returning to FIGS. 13 to 16, further the components and configuration of the venturi duct 58 will now be described.

As shown, the cross-sectional area of the central portion 70 of the venturi duct 58 is significantly smaller than that of the intake portion 68 and diffuser portion 72 in order to create the correct acceleration of flow.

Turning to the intake portion 68, the cross-sectional area of the intake portion 68 reduces towards the central portion 70 as the intake portion 68 tapers to meet the central portion 70. The rate of taper may be varied as appropriate; for example, the rate may be constant (in the manner of a frustrum or cone). Alternatively, the rate of taper may be varied with linear distance from the inlet 60, e.g. in the manner of a trumpet such that the rate of change of cross-sectional area is in some way proportional to the cross-sectional area itself. In many areas of aerodynamics, it is desirable to maintain a smooth variation in cross-sectional area to reduce drag and breakaway turbulence.

However, an angle of 2 to 10° is desired. Further, the tapering occurs in both the lateral and vertical planes as shown in the figures.

With regard to the diffuser portion 72, as shown in FIGS. 14 and 15, the diffuser portion 72 flares away from the rear section of the central portion 70 to the broad outlet 64. The rate of expansion of the cross-sectional area of the diffuser portion 72 may be varied as appropriate.

Turning in more detail to the central portion 70, with reference to FIGS. 13 to 16, a plurality of heat exchangers 104a-c is located horizontally within the upper portion and side portions of the central portion 70. As shown best in FIG. 13, the three heat exchangers 104a-c are located on three sides of the venturi duct 58 within the central portion 70.

In an embodiment where a supercharged ICE is used as a power source 32, heat exchanger 104a may comprise an intercooler for the supercharger.

The heat exchangers 104a-c are fed by individual intake ducts 106a-c arranged at the front of the motorcycle 10. Duct 106a is located adjacent and above the intake 60 and is fed from an intake 108a separate from the intake 60 and located within a part of the windshield 24. The duct 106a extends from the intake 108a to the heat exchanger 104a.

Ducts 106b and 106c are best shown in FIG. 15. The ducts 106b, 106c extend from intakes 108b, 108c which are located within the intake 60 of the venturi duct 58 and have substantially vertically-extending rectangular intake cross sections.

As shown in FIG. 16, the intake ducts 106b, 106c are separate from the venturi duct 58 downstream of the respective intakes 108b, 108c, are tortuous in shape and curve gently outwards then inwards towards the centreline in the region adjacent the heat exchangers 104b, 104c. The ducts 108b, 108c define a space between the outer walls of the venturi duct 58 and body portion 20 to enable mechanical aspects of the steering arrangement 50 to pass therebetween. This is shown in FIG. 9.

The face of each heat exchanger 104a-c is substantially parallel to the airflow and cooling air passes through the heat exchanger 104a-c from a first inlet side to a second outlet side perpendicular to the airflow through the central portion 70 and perpendicular to the velocity vector of the motorcycle 10 when in motion.

As shown, the heat exchangers 104a-c can be arranged substantially horizontally, i.e. substantially parallel to the airflow rather than perpendicular thereto as in conventional motorcycles. The use of heat exchangers in this manner significantly reduces aerodynamic drag which is generated when a heat exchanger is face-on to the airflow, creating a large frontal area in conventional motorcycle designs.

As shown, the parallel arrangement of the heat exchangers 104a-c reduces the frontal area and corresponding drag, while still having a significant flow-through of cooling air due to the pressure gradient between the intake 60 and the central region 70 of the venturi duct 58.

As shown, the airflow entering the venturi duct 58 is concentrated by the intake portion 68 and accelerated as the air enters into the central portion 70 of the venturi duct 58. Therefore, the pressure in the central portion 70 is considerably lower than that in the intake portion 68 due to its higher velocity.

In addition, the air pressure in the central portion 70 is significantly lower than that in the heat exchanger ducts 106a-c and so air is readily drawn through the heat exchangers 104a-c with considerable efficiency and with a minor effect on the overall drag of the arrangement when compared with a conventional cooling system on known motorcycle designs.

Once the air exits the central portion 70 the diffuser portion 72 has an irregular trumpet shape with sharp outward taper towards the rear of the motorcycle 10. This causes the air to expand and, consequently, slow in velocity. The reduced air velocity results in a higher air pressure. The exhaust 66 vents also into the diffuser portion 72 (in embodiments which utilise an ICE). Given the exhaust gas velocity and temperature, this assists in promoting airflow long the diffuser portion 72 and out of the outlet 64, again reducing the flow resistance of the venturi duct 58 to oncoming airflow.

Consequently the venturi duct 58 presents as small a restriction on the incoming airflow as possible, reducing the pressure at the front of the motorcycle 10 and therefore reducing pressure builds up with increased velocity. This, in combination with the reduced frontal area of the motorcycle 10, significantly reduces the resistance of the motorcycle 10 to forward motion, making the motorcycle 10 more efficient and faster for a given power output.

In addition, the inventor has recognised that the aerodynamic and drag-reduction properties of the venturi duct 58 can be modified in order to improve the performance of the motorcycle 10 in certain operating regimes.

In this regard, a pivotable deflector 114 is located in, or adjacent, the diffuser portion 72. As shown best in FIGS. 14 to 17, the deflector 114 comprises a substantially wing-shaped structure that extends across the full width of the venturi duct 58 in the diffuser portion 72. The deflector 114 is located approximately centrally in the vertical direction within the venturi duct 58, and located downstream of, and above, the exhaust 32a.

Figure 17:
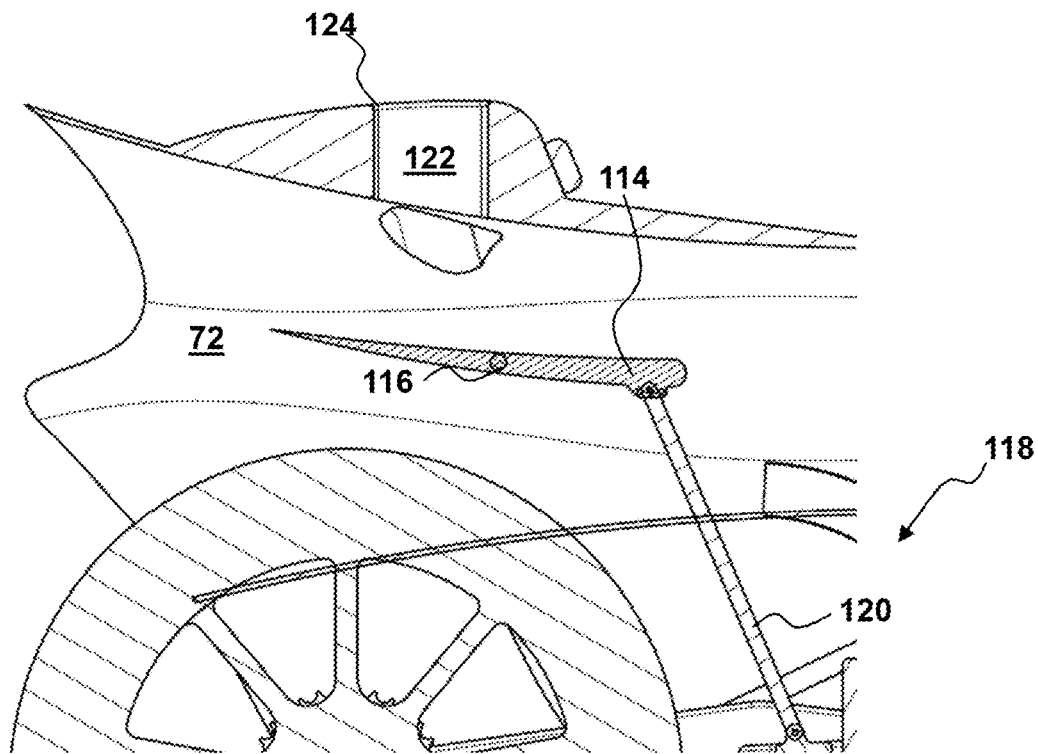
FIGS. 17 and 18 show side section views of a rear of the motorcycle showing a deflector in two different positions in use.
Figure 18:
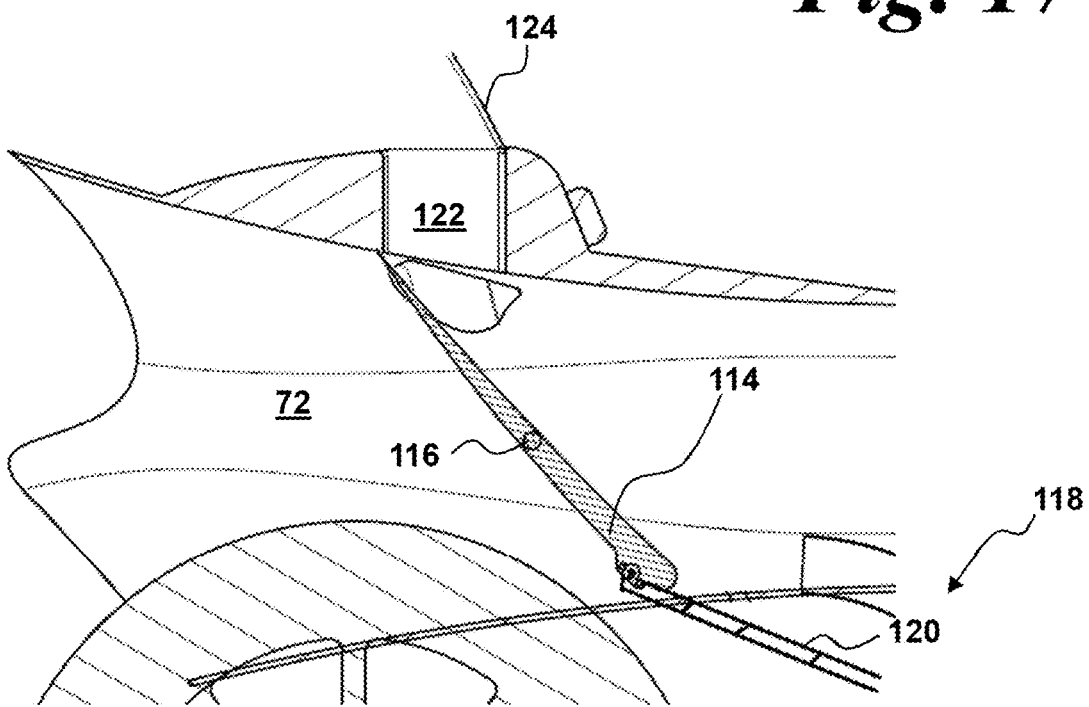

The deflector 114 is pivoted about a substantially central pivot point 116 (FIGS. 17 and 18). The pivot point 116 is arranged such that the deflector 114 rotates about a substantially horizontal axis. The deflector 114 is arranged such that, in the absence of other forces, the deflector will be maintained in a substantially horizontal configuration as shown in FIGS. 14 to 16. In other words, in the absence an actuating force, the airflow through the venturi 58 will act on the upper surface of the deflector 114 such that the force acting on the surface rearwards of the pivot point 116 is greater than that acting on the surface forwardly of the pivot point 116.

With reference to FIGS. 17 and 18, the deflector 114 is connected to an actuation mechanism 118. The actuation mechanism 118 comprises an actuator link 120 connected to the rear swingarm 36.

In use, the actuator link 120 is arranged to maintain the deflector 114 in the position shown in FIGS. 14 and 15, namely in the horizontal state where air can flow freely through the venturi duct 58.

However, under braking, the rear swing arm will move downwardly relative to the remainder of the body 12, and the actuator line 120 will pull the leading edge of the deflector 114 down into a closed position.

The open and closed positions are shown in FIGS. 17 and 18 respectively. These figures show the rear portion of the motorcycle 10 only.

As shown, under heavy braking, the rear swing arm moves downwardly and causes the actuation link 120 to pull the leading edge of the deflector 114 into the closed position. In the closed position, the deflector 114 substantially seals the entire diffuser portion 72 of the venturi duct 58. In other words, the leading edge of the deflector 114 abuts the lower surface of the diffuser portion 72 and the trailing edge of the deflector 114 abuts the upper surface of the diffuser portion 72.

In embodiments, the closing off of the venturi duct 58 by the deflector 114 creates a substantial increase in frontal area of the motorcycle 10 relative to the open position of the deflector 114. In addition, greater resistance to flow will also be created. Therefore, drag will increase and this will assist in slowing the motorcycle 10 during braking.

However, the inventor has recognised a further approach which has additional benefits. In the region of the body portion 20 behind the seat 22 is formed an outlet duct 122.

The outlet duct 122 has a flap 124. Under acceleration or constant velocity conditions, the flap 124 is maintained in a closed position as shown in FIG. 18. This may be by means of one or more of the external airflow over the motorcycle 10 in use, a pressure differential between the interior of the venturi duct 58 and the external air, or by mechanical means, such as a biasing arrangement (e.g. a spring or other resilient member) or simply a weighted arrangement such that the natural resting position of the flap 124 is in the closed position.

However, when the deflector 114 is in the closed position shown in FIG. 18, the airflow through the venturi duct 58 is deflected into the outlet duct 122 and the flap is biased open by this airflow.

This arrangement has numerous advantages. Firstly, airflow through the venturi 58 is not suddenly blocked and air is able to continue to flow during braking to ensure that, for example, the heat exchangers 104a-c receive sufficient airflow. Secondly, an outlet for exhaust gases from the exhaust 32a continues to be provided (although it is noted that the exhaust could be relocated to be downstream of the deflector 114). Thirdly, the upward deflection of a large plume of air will assist in increasing the drag of the motorcycle 10 due to the large bloom of fast, vertically-moving air. In addition, the force of the exiting air will act downwardly on the rear wheel, assisting in braking performance.

When the braking phase has been completed, the rear wheel 16 and rear swingarm 36 will rise relative to the body 12, the deflector 114 will be returned to the open position and the airflow will again continue to be exhausted from the outlet 64 of the venturi duct 58 as shown in FIG. 17.

The opening and closing of the deflector 114 can be tuned mechanically using, for example, a rocker. This may be used to create a particular point at which the deflector 114 is actuated, or may be used to create a pre-defined or variable rate of change for the deflector 114. For example, the rocker may be tuned to deploy the deflector 114 early in the braking phase and not close the deflector 114 until the motorcycle 10 has finished the braking phase. It is desirable for the deflector 114 to close rapidly once activated, and to open quickly once deactivated to minimise intermediate effects or disturbance to the motorcycle airflow. However, other profiles may be used as desired.

A significant advantage of the use of a venturi duct 58 on a motorcycle 10 is that a region of substantially laminar flow is provided through the centre of the motorcycle 10. This enables provision of aerodynamic surfaces and features to improve the performance of the motorcycle 10 under certain conditions. The use of downforce and/or lift generating surfaces will be described in more detail in the second embodiment of FIGS. 19 to 32.

Various additions or alternatives are possible within the scope of the present disclosure. For example, whilst the particular shapes of the sections of the venturi duct 58 have been described herein, it is to be understood that these are purely exemplary and alternatives may well be used.

Whilst most of the venturi duct 58 surfaces are shown as substantially planar (resulting in a substantially rectangular cross-section of the duct), this need not be the case. For example, the cross-section of the venturi duct may be circular, elliptical or any other suitable shape as best to maximise the reduction in frontal area whilst also conforming to the desired shape of body 12 of the motorcycle 10.

SECOND EMBODIMENT

FIGS. 19 to 32 show different isometric views of a motorcycle 200 according to an alternative embodiment of the present invention.

The motorcycle 210 has a body 212, a front wheel 214 and a rear wheel 216. A power unit 218 (shown generally in FIGS. 16 to 24 and shown in later Figures) is located between the front and rear wheels 214, 216, and is arranged to drive the rear wheel 216 through a pair of swingarms 220. The power unit 218 may take any suitable form, and may be an internal combustion engine (ICE) such as a piston engine or a rotary (Wankel) engine, an electric motor or a combination power source (e.g. a hybrid drivetrain with an ICE assisted by an electric motor). If an electric power source is used, then a centrally-mounted motor driving the rear wheel is preferable. However, in-wheel motors may be used within the rear and/or the front wheel hub in certain circumstances.

As for the earlier embodiment, the front wheel 214 is attached to the body 212 via a front upper and lower wishbones, a steering arm and a suspension pushrod (not shown). However, the skilled person would be readily aware of alternatives that could be used, including front forks and other configurations.

The body 212 further comprises a seat 222 for a rider and a windshield 224. Located forwardly of the seat 222 is a raised portion of the body 212 operable to contain a heat exchanger 226 (see FIGS. 22 to 24) and, optionally, a power supply unit such as a battery (in the case of electric or hybrid power) or a fuel tank (in the case of ICE power).

The body 212 may be formed as a monocoque structure, or may comprise individual components connected together. The body 212 broadly comprises two main elements—a base frame 228 and a duct body 230. However, whilst these elements are described separately for clarity, they need not be separate elements and may be formed as a unitary chassis, or may comprise multiple parts connected together.

In this embodiment, the base frame 228 forms a V-shape at a lower end and is operable to support the power unit 232, power ancillaries such as ducting, fuel pipes and connections, and electronics. The base frame 228 also provides connections for the rear swingarms 220 and front wishbones to enable connection and suspension of the front and rear wheels 214, 216.

The base frame 228 comprises a pair of substantially vertical side panels 232 which form side surfaces of the motorcycle 200 and extend towards the upper surface of the body 212.

The duct body 230 forms part of the external surface of the motorcycle 200 and defines a venturi duct 234 therethrough. The venturi duct 234 extends from the front of the motorcycle 10 through to the rear of the motorcycle 10. The venturi duct 234 comprises an intake 236 at a front portion 238 of the body 12 and an outlet 240 at a rear portion 242 of the body 12.

By providing a substantially open passageway through the centre of the motorcycle chassis between the front wheels and between the seat 222 for the rider and the power unit 218, both of these issues can be addressed. The venturi duct reduces the frontal area, whilst still maintaining the seat 22 at a height suitable to enable a rider to control the motorcycle as desired.

FIGS. 22 to 27 show a selection of views of the venturi duct 234 in more detail. As shown, and as for the first embodiment, the venturi duct 234 extends through the centre of the body 12 extending from the intake 236 to the outlet 240. As for the previous embodiment, there is a direct line of sight through the intake 236 and the venturi duct 234 through to the outlet 240. The venturi duct 234 has an intake portion 242, a central portion 244 and a diffuser portion 246.

The central portion 244 has a smaller cross-sectional area than the intake and outlet portions 42, 46 thereby creating a venturi flow section. In other words, the cross-sectional area of the venturi duct 234 reduces gradually from the intake 236 to the central portion 244 and then increases gradually through the length of the diffuser portion 246 to the outlet 240.

Airflow entering the intake 236 will pass through the intake portion 68 into the central portion 244 and will be accelerated due to the reduced cross-sectional area, before slowing in the diffuser portion 246 as the cross-sectional area increased. The acceleration of the airflow into the central portion 244 creates a pressure gradient between the central portion 244 and the intake 236, which reduces the pressure at the front of the motorcycle 10 when in motion.

In embodiments, the venturi duct 234 is formed integrally with the body 12. In other words, the body 12 is formed as a monocoque and the venturi duct 234 is defined as part of the body 12.

Whilst cooling ducts and channels are known in motorcycle design, the inventor of the present application has discovered, for the first time, that provision of such a large substantially open duct extending directly between the front and the rear of the motorcycle 10 between the front and rear wheels 14, 16 can lead to significant efficiency and aerodynamic advantages for motorcycle design, leading to improved performance.

In embodiments, the venturi duct 234 is arranged to have a minimum cross-sectional area in the range of 10,000 mm$^2$ (0.01 m$^2$) to approximately 90,000 mm$^2$ (0.09 m$^2$). In addition, it is desired that the intake portion has an angle to a centre line of the venturi of between 1° and 20°, and a diffuser portion having an angle to the centreline of the venturi of between 1° and 20°. These correspond to a cone angle for each of the intake portion and the diffuser portion from 2° and 40° (where the cone angle is the angle that each upper/lower or side surfaces make relative to one another, and are double that of a single plane diffuser element. It is noted that the cone angles of the second embodiment are considerably more aggressive than for the first embodiment. However, the skilled person would recognise the situations in which the relative dimensions are appropriate and these dimensions and configurations are exemplary and may be varied as appropriate.

The structure of the venturi duct 234 of the second embodiment will now be described with reference to FIGS. 19 to 32.

Figure 19:
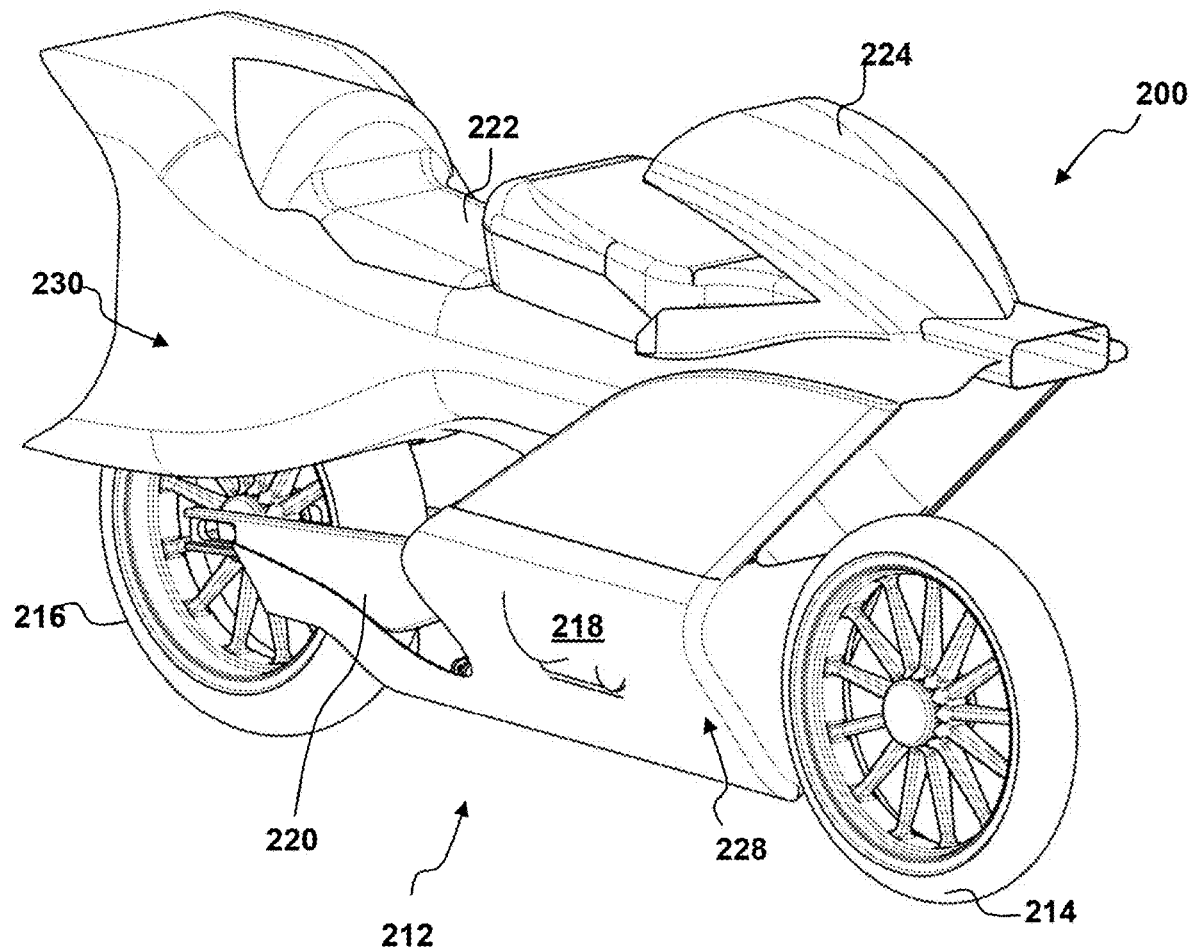
FIG. 19 is an isometric view of a motorcycle according to another embodiment of the present invention.
Figure 20:
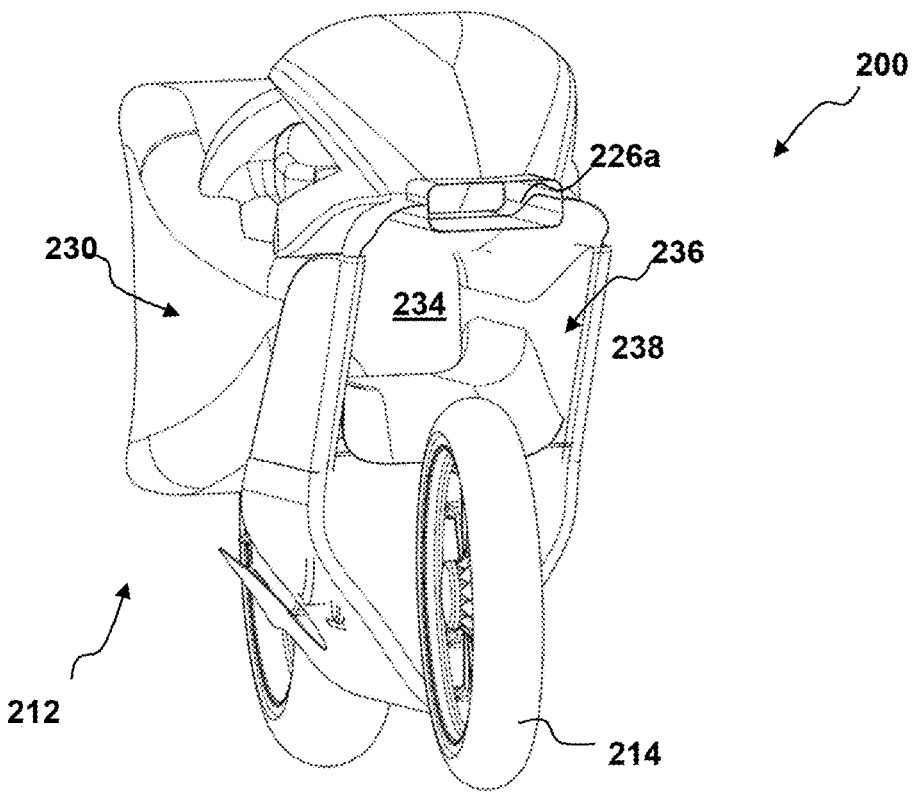
FIG. 20 is a further isometric view of the motorcycle of FIG. 19.

As shown in FIGS. 19 and 20, the intake 236 is delimited by the duct body 230 and a portion of the side panels 32 of the base frame 28, which form upper, lower and side walls defining the intake portion 242. The intake 236 is broad and substantially rectangular in shape, and forms a significant portion of the front region of the motorcycle 10. In this embodiment, the intake 236 is slanted forwardly so that the upper wall extends forwardly of the lower wall.

The intake 236 is located adjacent the front wheel 214 and rearwardly of the front wheel 214 such that the front wheel 214 extends into a flowpath for air passing into the intake 236 in use. This is a different configuration from the first embodiment. This is shown best in FIG. 20, where the lower wall of the intake 236 is at a lower height than the top of the front wheel 214.

Further, a front wall of the base frame 228 located below the intake 236 and in communication with the lower wall is arranged at an obtuse angle to the intake 236 when viewed in profile. This ensures that the airflow is directed into the intake 236.

The location of at least a part of the intake 236 directly behind the front wheel 214 can be utilised to draw turbulent air generated by the rotating front wheel 214 into the venturi duct 234 where it can be accelerated, reducing the pressure and turbulent air in the region of the front wheel 214. This is in marked contrast to the first embodiment.

However, this need not be the case, and the intake 236 may be separated from the front wheel by means of, for example, a splitter extending forwardly of the intake portion 242 as described and shown in the first embodiment. Alternatively or additionally, the front wheel 214 may comprise a mudguard or shield which substantially aerodynamically isolates the intake 236 from the airflow coming off the front wheel 214.

Figure 21:
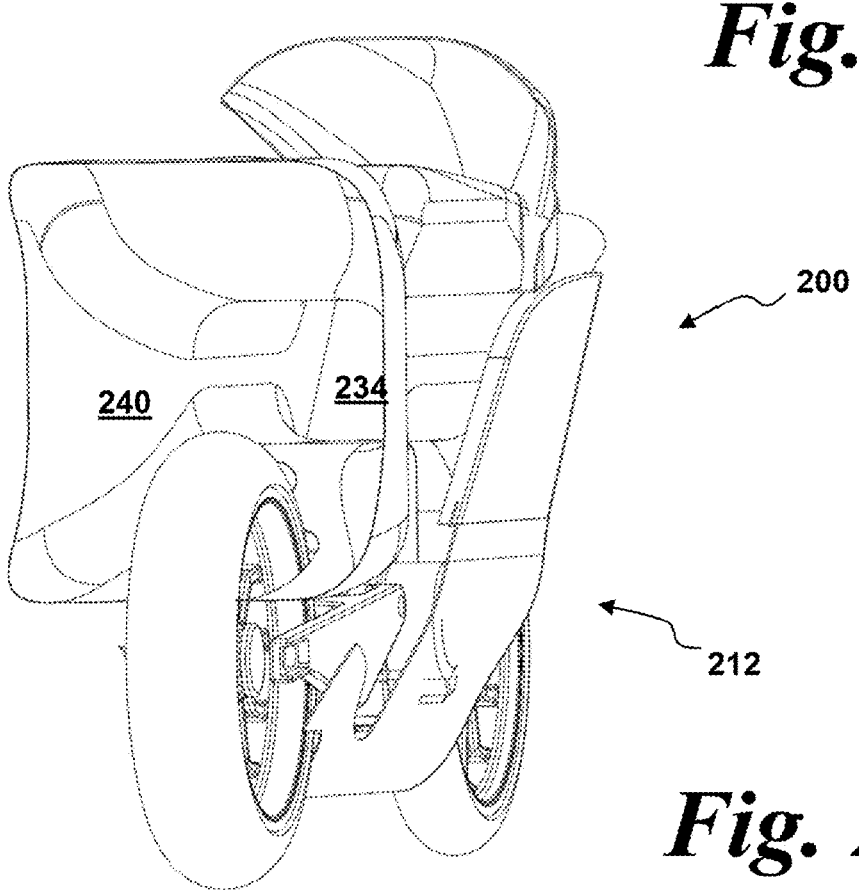
FIG. 21 is a rear isometric view of the motorcycle of FIG. 19.

Turning to FIG. 21, the venturi outlet 240 is located at the rear of the motorcycle adjacent the rear wheel 216. The venturi outlet 240 is delimited by a rear portion of the duct body 230 which forms the diffuser portion 246 of the venturi duct 234. The diffuser portion 246 forms essentially a square frustrum expanding outwardly towards the rear of the motorcycle 10 in the region adjacent and rearwardly of the seat 222.

However, whilst the outlet 240 is shown as having a substantially rectangular cross-section, this need not be the case and any suitable shape may be used; for example, the outlet 240 and/or diffuser portion 246 may take any suitable cross-sectional shape such as circular, ovoid or rectangular.

Figure 22:
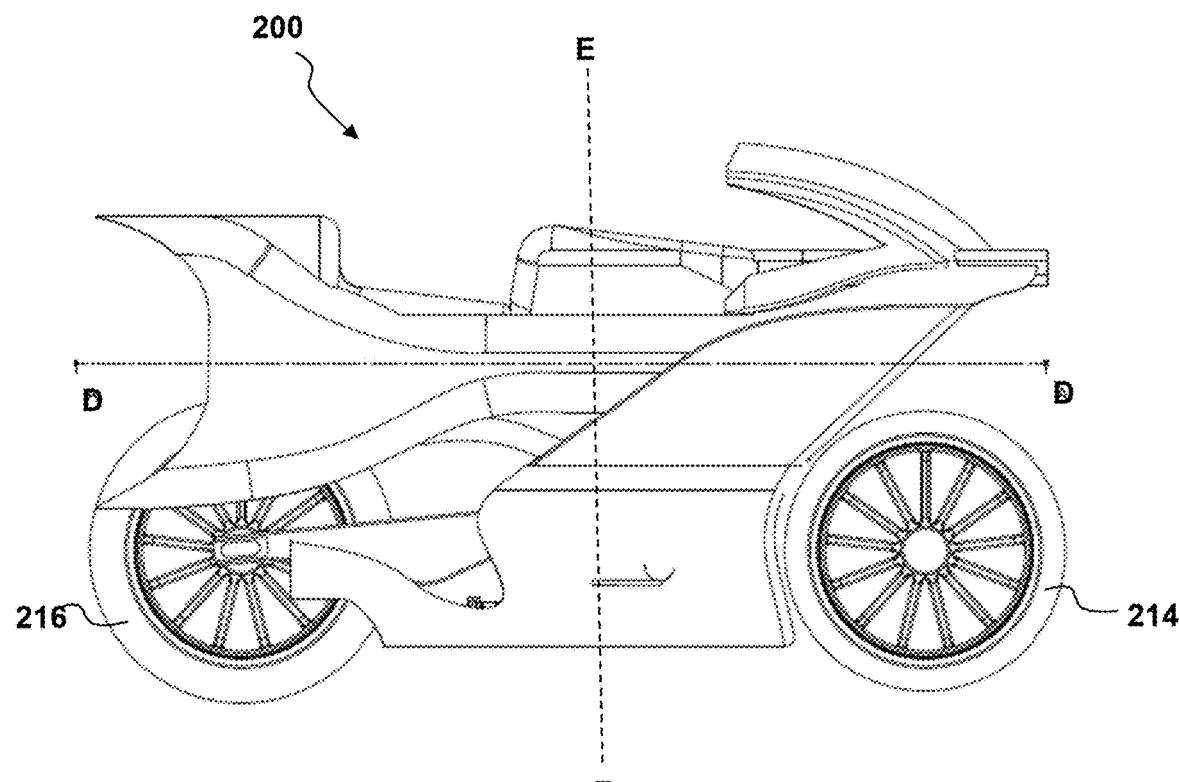
FIG. 22 is a side view of the motorcycle of FIG. 19.
Figure 23:
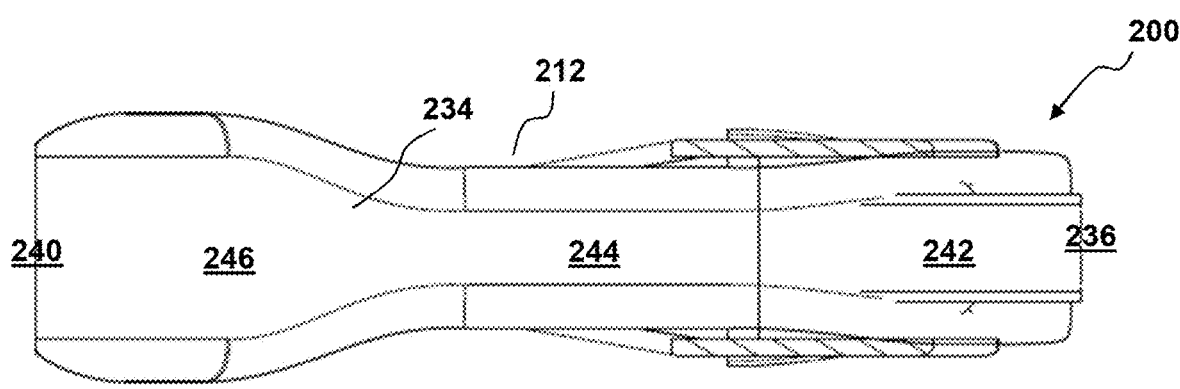
FIG. 23 is a section view taken along the plane D-D of FIG. 22.
Figure 24:
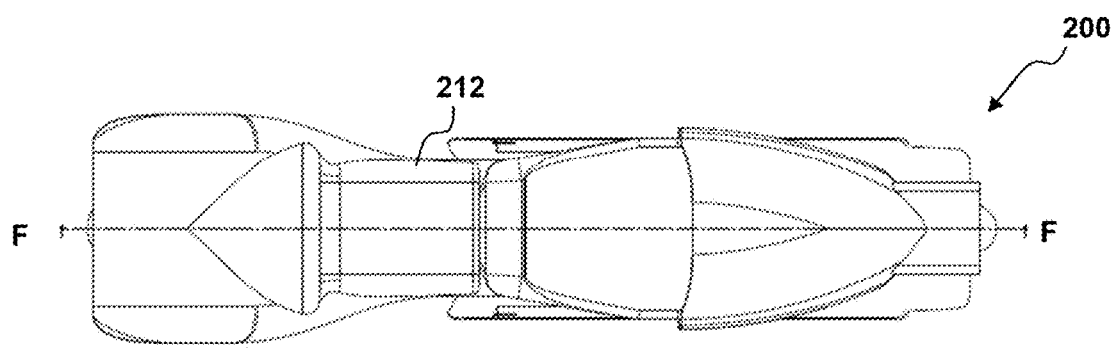
FIG. 24 is a plan view of the motorcycle of FIG. 19.

Turning to the diffuser portion 246 in more detail, the diffuser portion 246 comprises an upper wall, a lower wall and sidewalls. As shown in FIGS. 21 and 22, a portion of the rear wheel 216 extends into the space defined by the diffuser portion 246. In addition, the rear wheel 216 extends into the outlet 240 itself. In embodiments, the rear wheel 216 rotates within a cut out formed in the lower wall.

This arrangement has notable benefits. Firstly, the airflow generated by rotation of the rear wheel 216 is at least partly counteracted by the flow through the diffuser portion 246 and outlet 240. This reduces drag occurring from the substantially vertically moving airflow from the rear wheel 216.

Figure 25:
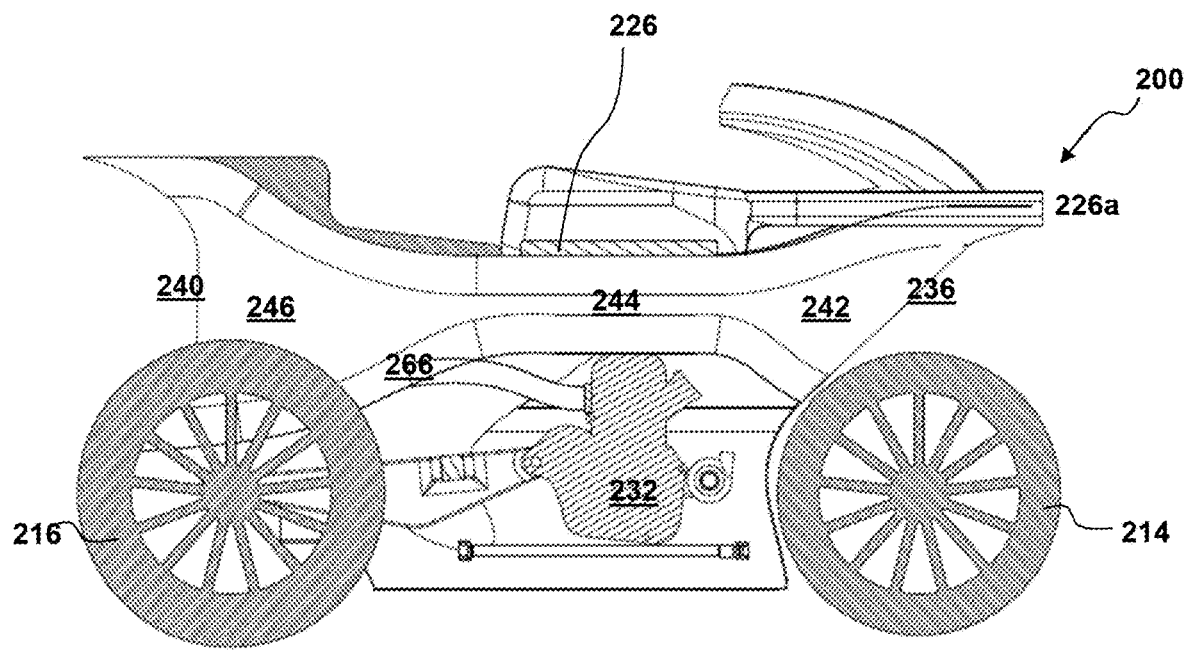
FIG. 25 is a section view taken along the plane F-F of FIG. 24.
Figure 26:
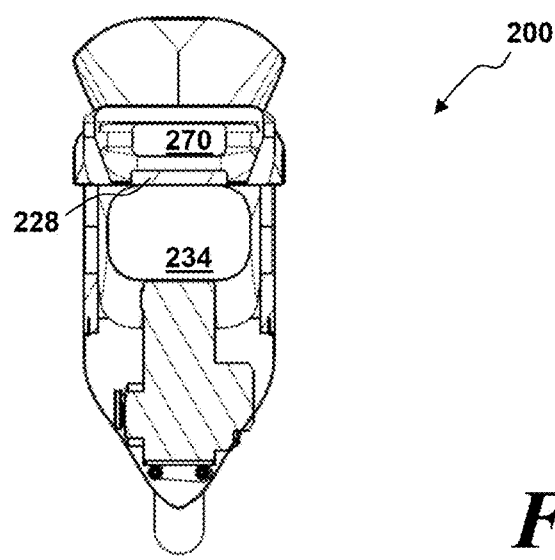
FIG. 26 is a front section view taken along the plane E-E of FIG. 22.

Secondly, and with reference to FIG. 25, in the case where the power unit 218 comprises an internal combustion engine, an exhaust pipe 266 of the internal combustion engine may exhaust into the diffuser portion 246 of the venturi duct 234. This has the additional benefit of providing increased flow into the diffuser portion 246 of the venturi duct 234, causing yet further acceleration of air through the venturi duct 234 and assisting in drawing airflow from front of the motorcycle 200 into the venturi duct 234.

By providing such an arrangement, the airflow from the rear wheel 216 and exhaust 266 is achieved to achieve higher efficiency of the venturi duct 234. As shown in FIG. 25, the exhaust gases will also be diluted by the airflow through the venturi duct 234. This will have the effect of cooling the exhaust gases, reducing the thermal load on components of the motorcycle 10 downstream of the exhaust 266 and reducing noise output from the exhaust 266.

However, the arrangement need not be as shown. The skilled person would readily understand that variations could be made which would fall within the scope of the present disclosure. For example, the rear wheel 216 need not project into the diffuser portion 246 of the venturi duct 234 and maybe separated there from, for example by the lower wall 60. Additionally, the exhaust flow onto the rear wheel 216 will counteract at least some of the airflow around the rear wheel 216 in use.

The configuration of the venturi duct 234 will now be described with reference to FIGS. 19 to 27. As shown in, particularly, the cross-sectional area of the central portion 244 of the venturi duct 234 is significantly smaller than that of the intake portion 242 and diffuser portion 246 in order to create the correct acceleration of flow.

Turning to the intake portion 242, the cross-sectional area of the intake portion 242 reduces sharply towards the central portion 244 as the intake portion 242 tapers to meet the central portion 244. The rate of taper may be varied as appropriate; for example, the rate may be constant (in the manner of a frustrum or cone). Alternatively, the rate of taper may be varied with linear distance from the inlet 236, e.g. in the manner of a trumpet such that the rate of change of cross-sectional area is in some way proportional to the cross-sectional area itself. In many areas of aerodynamics, it is desirable to maintain a smooth variation in cross-sectional area to reduce drag and breakaway turbulence.

However, an angle of at least 1° to 20° is desired. Further, the tapering occurs in both the lateral and vertical planes as shown in figures five and seven.

The diffuser portion 246 flares widely away from the rear section of the central portion 244 to the broad outlet 240. The rate of expansion of the cross-sectional area of the diffuser portion 246 may be varied as appropriate.

Figure 27:
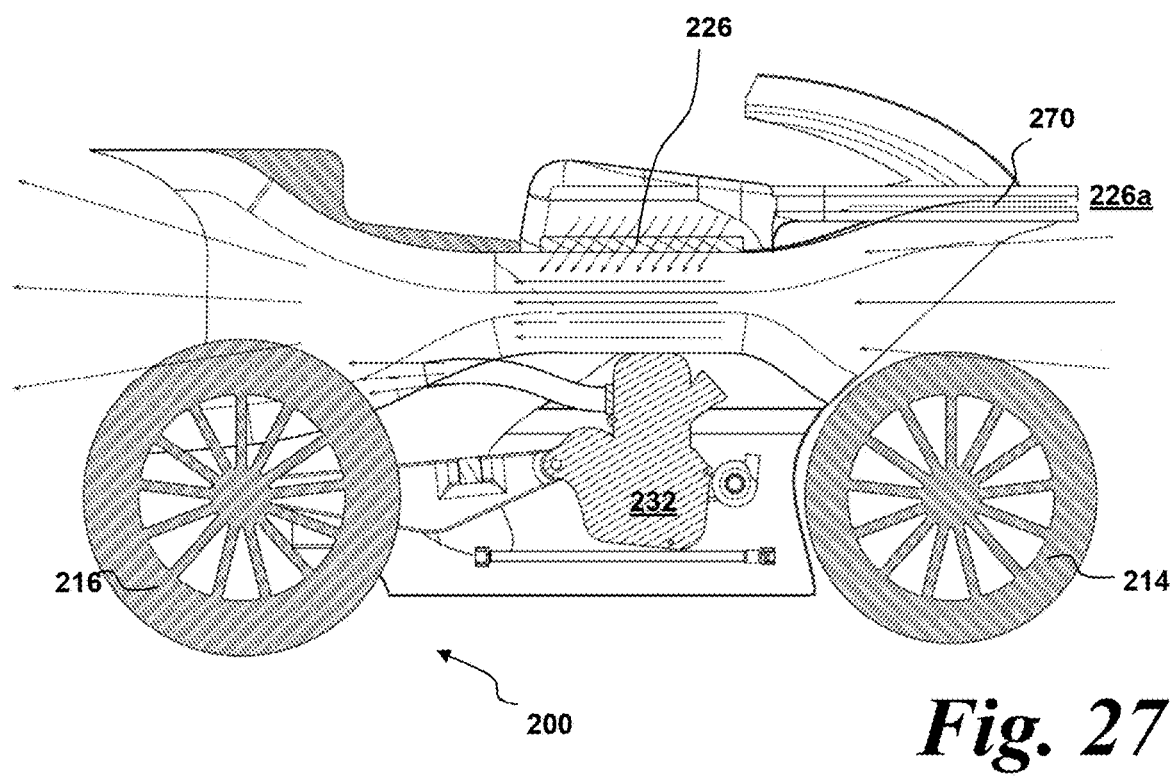
FIG. 27 is a section view similar to FIG. 25 but showing the airflow pathways in use.

Turning in more detail to the central portion 244, with reference to FIGS. 25 and 27, the heat exchanger 226 is located horizontally within the upper portion of the central portion 244. In other words, the face of the heat exchanger 226 is substantially parallel to the airflow and cooling air passes through the heat exchanger 226 from a first inlet side to a second outlet side perpendicular to the airflow through the central portion 244 and perpendicular to the velocity vector of the motorcycle 200 when in motion.

The heat exchanger configuration comprises an exchanger inlet 226a located above the intake 236 at the front of the motorcycle 200. The inlet 68 can be seen best in FIGS. 1, 7 and 8. The inlet 68 leads to a heat exchanger duct 70 which runs substantially horizontally into the heat exchanger 226.

As shown, the heat exchanger 226 can be arranged substantially horizontally, i.e. substantially parallel to the airflow rather than perpendicular thereto as in conventional motorcycles. The use of a heat exchanger 226 in this manner significantly reduces aerodynamic drag which is generated when a heat exchanger is face-on to the airflow, creating a large frontal area in conventional motorcycle designs.

FIG. 27 shows a schematic diagram, similar to FIG. 25, illustrating the airflow through the heat exchanger 226 and venturi duct 234. As shown, the intake 236 is at a higher pressure than the low-pressure region of the central portion 244 of the venturi duct 234.

Therefore, airflow is drawn through the heat exchanger 226 due to this pressure gradient. As shown, the heat exchanger 226 is substantially parallel to the airflow, thereby reducing frontal area and drag, while still having a significant flow-through of cooling air due to the pressure gradient between the intake 68 and the central region 244 of the venturi duct 234.

As shown, the airflow entering the venturi duct 234 is concentrated by the intake portion 236 and accelerated as the air enters into the central portion 244 of the venturi duct 234. Therefore, the pressure in the central portion 244 is considerably lower than that in the intake portion 242 due to its higher velocity.

In addition, the air pressure in the central portion 244 is significantly lower than that in the heat exchanger duct 270 and so air is readily drawn through the heat exchanger 226 with considerable efficiency and a minor effect on the overall drag of the arrangement when compared with a conventional cooling system on known motorcycle designs.

Once the air exits the central portion 244 the diffuser portion 246 has a frustrum shape with sharp outward taper towards the rear of the motorcycle 200. This causes the air to expand and, consequently, slow in velocity. The reduced air velocity results in a higher air pressure. The exhaust 66 vents also into the diffuser portion 246 (in embodiments which utilise an ICE). Given the exhaust gas velocity and temperature, this assists in promoting airflow long the diffuser portion 246 and out of the outlet 240, again reducing the flow resistance of the venturi duct 234 to oncoming airflow.

Consequently the venturi duct 234 presents as small a restriction on the incoming airflow as possible, reducing the pressure at the front of the motorcycle 200 and therefore reducing pressure builds up with increased velocity. This, in combination with the reduced frontal area of the motorcycle 200, significantly reduces the resistance of the motorcycle 200 to forward motion, making the motorcycle 200 more efficient and faster for a given power output.

Various additions or alternatives are possible within the scope of the present disclosure. For example, whilst the particular shapes of the sections of the venturi duct 234 have been described herein, it is to be understood that these are purely exemplary and alternatives may well be used.

Whilst most of the venturi duct 234 surfaces are shown as substantially planar (resulting in a substantially rectangular cross-section of the duct), this need not be the case. For example, the cross-section of the venturi duct may be circular, elliptical or any other suitable shape as best to maximise the reduction in frontal area whilst also conforming to the desired shape of body 212 of the motorcycle 200.

Alternative or additional configurations will now be described. The provision of a fast flowing air a channel within the centre of the body 12 of the motorcycle 200 presents numerous opportunities for airflow control in a manner which was entirely impossible or impractical with known motorcycle designs to date.

For example, motorcycle aerodynamic surfaces (for example on Moto GP motorcycles in 2016/2017) are affected by the angle of lean of the motorcycle in corners. Therefore, there are different flow conditions when leaning in a corner when compare to a straight, for example. However, in the present case, a substantially constant airflow may be maintained through the venturi duct 234 irrespective of the orientation of the motorcycle with respect to a ground surface.

For example, whilst there may be differences in flow rate with velocity and potentially angular turn rate which may influence the direction of airflow into the intake 236, within the central portion 244 of the venturi the airflow will be substantially laminar and at a constant speed and pressure for a given motorcycle velocity.

This presents opportunities for utilising aerodynamic devices within the venturi duct 234 to improve the performance of the motorcycle 200 under particular operating regimes.

Figure 28:
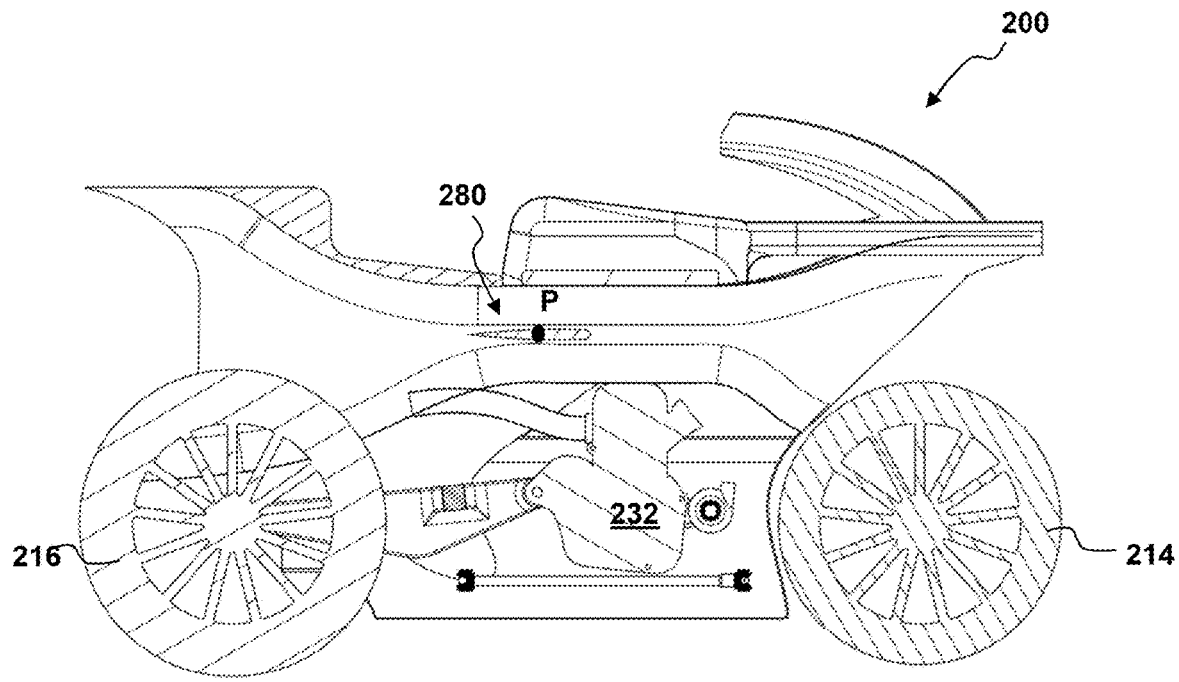
FIG. 28 is a section view similar to FIG. 25 showing a motorcycle according to a further embodiment having an aerodynamic wing in a first configuration.
Figure 29:
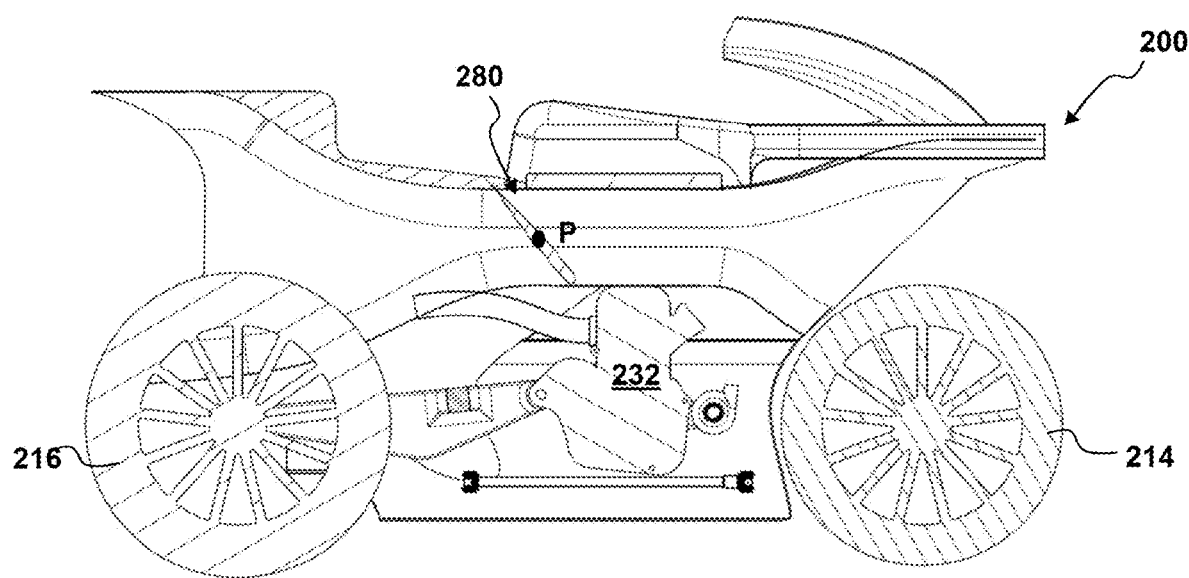
FIG. 29 is a section view similar to FIG. 26 showing the aerodynamic wing in a second configuration.

FIGS. 28 and 29 show an arrangement whereby a wing 280 is placed within the central portion 244 of the venturi duct 234. The wing 280 is substantially movable about a pivot point P in use. Therefore, the wing 80 may be used to generate downforce (i.e. an inverted lift force) which may assist in enhancing the grip of the motorcycle 200 due to the additional force acting on the contact patch of the tyres. The wing may be placed such that the centre of pressure of the wing is coincident with the centre of gravity of the motorcycle 200. Therefore, any generated downforce will not cause a moment between the centre of gravity of the motorcycle 200 and centre of pressure of the wing 80.

Note that the wing differs from the deflector 114 described in the first embodiment in both location and configuration.

By rotation of the wing 280 about the pivot P, the amount of downforce/lift can be varied as required. For example, on a straight (where speed and acceleration are a primary concern) the wing 280 maybe oriented at a neutral or positive incidence such that no net downforce is generated and drag is reduced to a minimum. However, in a corner, the wing 280 may be arranged to apply a lift force vertically downwards through the contact patch of the tires, providing enhanced grip. Additionally or alternatively, additional downforce maybe provided to enhance acceleration and or/breaking.

As a further additional alternative, the wing 280 may be pivoted to close the venturi duct 234 entirely. In other words, the wing 280 operable to rotate such that, for example, the trailing edge of the wing 280 is in contact with the upper surface of the central portion 244 and the leading edge of the wing 280 is in contact with the lower surface of the central portion 244 (or vice versa).

By provision of this arrangement, the venturi duct 234 can be effectively closed off such that, firstly, the frontal area is concomitantly increased and, secondly, such that the pressure on the front of the motorcycle 200 is also increased. This may assist during braking of the motorcycle 200 into a corner or on a straight since the drag will be correspondingly increased due to the increased frontal area and increased pressure at the nose of the motorcycle 200.

Alternatively, an aerodynamic surface such as a wing maybe placed in a different part of the venturi duct 234. Whilst it is generally desirable to have an aerodynamic surface within the central portion 244 (where the airflow is fastest and therefore any aerodynamic surface will have the greatest effect), this need not be the case. For example, a wing or other aerodynamic surface may be placed within the intake 236 or intake portion 242 and this may then be used to increase downforce on the front wheel; for example during braking or to prevent the front wheel 214 from lifting off the ground during hard acceleration.

Alternatively, a wing may be placed in the diffuser portion 246 (as for the first embodiment) or any other location adjacent the rear wheel 216 to improve traction thereof.

Figure 30:
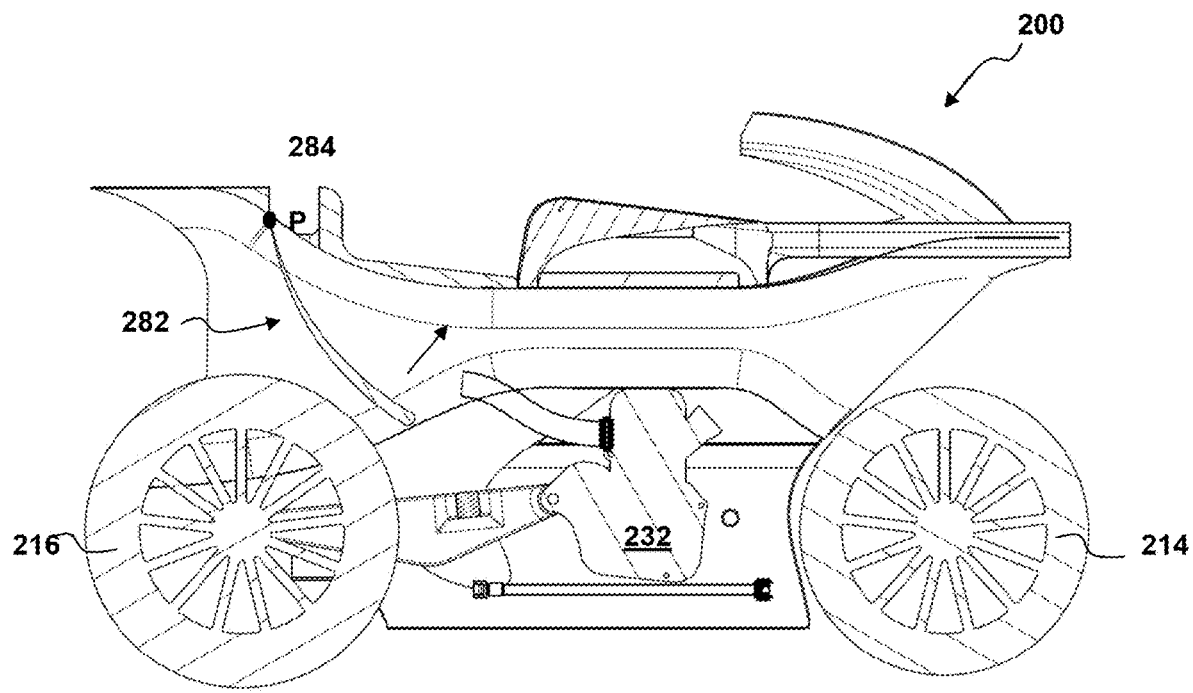
FIG. 30 is a section view similar to FIGS. 25, 26 and 27 showing a motorcycle according to a further embodiment having a flap in a deflected configuration.

A further variation or addition shown in FIG. 30. In FIG. 30, an alternative movable surface 282 is provided. In this embodiment, the movable surface 282 is located within the diffuser portion 246. Further, the movable surface 282 has a greater chord than the wing of the previous embodiments.

In this alternative, the surface 282 is again configured to pivot to alternate between a first configuration providing either a neutral aerodynamic profile or hidden from the airflow to a second configuration providing a resistance against the airflow to assist in braking or other assistance through drag generation. However, in this arrangement, the surface 282 is arranged to form a part of the wall of the diffuser portion and swing down when activated. In addition, an outlet 284 through the upper end of the venturi duct 234 is provided. The outlet is arranged to the rear of the seat 222 and rider in use and is shown in the second configuration in FIG. 30.

In use, when the movable surface 282 is rotated to the closed position as shown in FIG. 30, the movable surface 282 effectively seals the outlet 240 of the diffuser portion 246 and the airflow is instead directed through vertical outlet 284. Consequently, rather than entirely closing the whole venturi duct 234, the airflow through the venturi duct 234 is deflected upwardly such that a substantially vertical plume of fast moving air is exhausted through the outlet 284. In addition, the movable surface 282 is located downstream of the exhaust 266 and so the exhaust gases provide additional airflow vertically up and out through the outlet 284.

The advantage of this arrangement is that, in addition to effectively "sealing" the venturi duct 234 for the determination of frontal area, the upwardly directed plume of gas from the airflow through the venturi duct 234 will also provide an additional drag force in the form of resistance created by a substantially vertical sheet of air generated by the outlet 84. Finally, the force of the air exiting the outlet 84 will also create an equal and opposite reaction on the motorcycle 200, providing additional downforce.

Such a configuration may be particularly useful during heavy braking where the additional drag and downforce will reduce stopping distances considerably. This is, in principle, similar to the first embodiment although different in construction.

Alternatives may be utilised. For example, the movable aerodynamic device need not take the form of a wing in the centre of the venturi duct 234 and, instead, may form a movable section of a wall of the venturi duct 234 as described in relation to FIG. 30. For example, a movable flap may lie flush with the lower or upper surface of the venturi duct when not in use, and extend from the upper/lower surface of the venturi duct 234 in use to effectively the position of the wing shown in FIG. 12. The flap may be pivoted at a rear point adjacent the outlet 84 and deploy under electronic or hydropneumatic activation. The airflow through the venturi duct 234 will apply a force to locate the flap in the open position, and the flap could then be retracted hydraulically.

Such a device would, in a failure condition, be in the normally open position where airflow is deflected. This may, in certain arrangements, be undesirable.

Therefore, in the alternative, a flap may be located flush with the lower surface of the diffuser portion 246 when in the closed position, and be hydraulically actuated into an open position where the airflow is deflected upwardly.

Alternatively or additionally, the entire rear section of the venturi duct 234 may be movable in an articulated manner as a form of "vectored thrust".

As a further alternative, a plurality of parallel movable slats may be used which can be held at a specified angle, for example, a plurality of slats located adjacent the outlet 240 and rotatable about a horizontal axis may be used to deflect air upwards through a suitable outlet if required. Whilst a plurality of aerodynamic surfaces potentially create more drag, each surface can be smaller and will have a reduced force acting thereupon.

Figure 31:
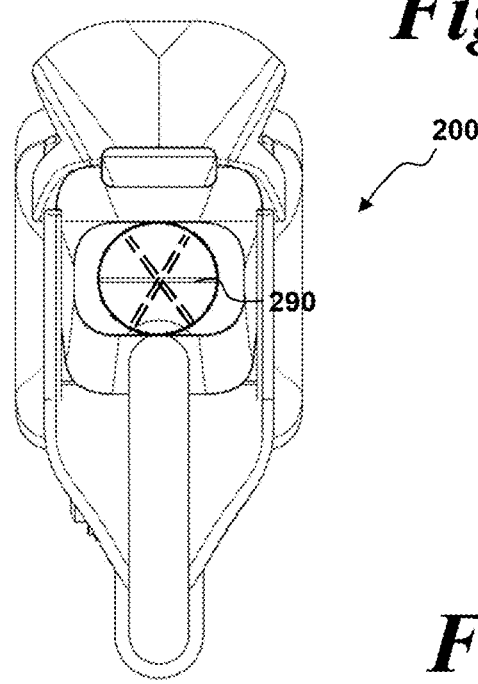
FIG. 31 is a front view of a motorcycle according to a further embodiment showing a rotatable wing in different rotational positions.
Figure 32:
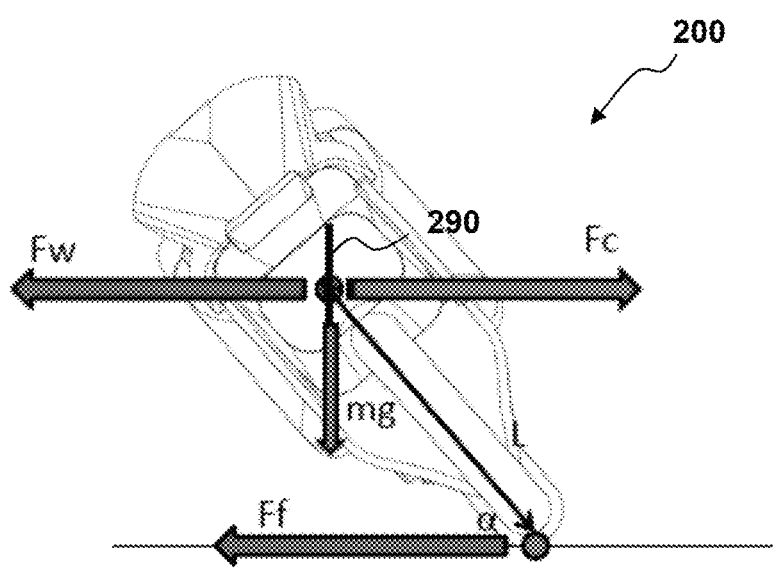
FIG. 32 is a schematic view of a motorcycle in motion illustrating the forces acting on the motorcycle having the wing of FIG. 31.

FIGS. 31 and 32 show a motorcycle 200 according to a further embodiment of the present invention. In this embodiment, a wing 290 is located within the centre portion 244 of the venturi duct 234. However, in this embodiment, the wing 90 is attached to a movable rotatable section 292 which is operable to rotate about a central longitudinal axis of the motorcycle 200 shown generally as YY in FIG. 31.

The benefit of this arrangement is that the wing 290 can be rotated to an arbitrary angle (shown schematically by the dotted lines in FIG. 31) to provide a force which has a movable direction vector. This can be used to provide downforce in any direction with respect to the longitudinal axis of the motorcycle 200. The benefit of this arrangement is that the wing 290 can be rotated to provide a force, for example, in a fixed direction (for example, vertically downwards) irrespective of the lean angle of the motorcycle 200.

FIG. 32 shows a schematic diagram of the motorcycle 200 in a turn. Various forces are shown; the ability of the motorcycle 200 to corner is provided by friction force Ff acting through the tyre contact patch. In a turn, the motorcycle 200 is required to lean due to the moment created by the height L between the centre of gravity of the motorcycle 200 and the contact patch. This creates an outward force Fc which acts to rotate the motorcycle towards the outside of the turn. This is, conventionally, counteracted by leaning the motorcycle such that a horizontal component of the downward force mg resulting from the location of the centre of gravity counteracts the leaning moment to ensure that the motorcycle is stable in a turn.

However, through use of the rotatable wing 290 of the present invention, a force Fw can be applied inwardly into the turn to counteract the moment required. Therefore, it is possible to reduce the lean angle of the motorcycle 200 for a given turn radius and speed. In certain circumstances, where a motorcycle lean angle may determine the maximum cornering radius for a given speed, by being able to reduce the lean angle, the motorcycle may be able to turn more rapidly and more safely.

In FIG. 32, the wing is shown substantially vertical to apply a force Fw which directly counteracts the force Fc. This may only be appropriate if the centre of force Fw is coincident with the centre of gravity Cg.

In cases where it is not, it may be preferred to ensure that the wing always provides a downforce Fw in a downward direction irrespective of the lean of the motorcycle 200. In other words, the wing 290 is maintained in a horizontal position. Again, this will reduce the lean of the motorcycle 200 in a turn due to the additional applied force.

A significant problem with motorcycle tyres is that the semi-circular cross section does not allow a large contact patch. By careful tuning of the rotatable wing 290, it may be possible to enable a motorcycle to corner without lean or with only minimal lean. This may then enable tyres having a flatter, squarer profile to be used (such as car tyres) to increase the contact patch of the tyres on the road surface.

Embodiments of the present invention have been described with particular reference to the examples illustrated. While specific examples are shown in the drawings and are herein described in detail, it should be understood, however, that the drawings and detailed description are not intended to limit the invention to the particular form disclosed. It will be appreciated that variations and modifications may be made to the examples described within the scope of the present invention.

The invention claimed is:

1. A motorcycle comprising a front wheel, a rear wheel and a vehicle body, the vehicle body comprising an open elongate duct extending longitudinally through a central portion of the vehicle body between an open inlet aperture arranged at a front portion of the vehicle body and an open outlet aperture arranged at a rear portion of the vehicle body; wherein the inlet aperture, outlet aperture and elongate duct are located and arranged to define a line of sight between at least a part of the or each inlet aperture and at least a part of the or each outlet aperture through the elongate duct.

2. A motorcycle according to claim 1, wherein the or each open inlet aperture is located adjacent the front wheel and/or the or each open outlet aperture is located adjacent the rear wheel.

3. A motorcycle according to claim 1, wherein the elongate duct extends parallel to a longitudinal center line plane of the vehicle body between the or each inlet aperture and the or each outlet aperture.

4. A motorcycle according to claim 3, wherein the longitudinal center line plane extends through at least a part of the elongate duct.

5. A motorcycle according to claim 1, wherein the vehicle body further comprises a seat for a rider and a power source located between the front and rear wheels, wherein the elongate duct extends through the vehicle body between the seat and the power source.

6. A motorcycle according to claim 5, wherein the power source comprises an internal combustion engine and/or an electric motor.

7. A motorcycle according to claim 6, wherein the power source comprises an elongate heat exchanger element having a longitudinal axis and operable to provide cooling in response to an airflow passing through the elongate heat exchanger element in a direction perpendicular to the longitudinal axis of the elongate heat exchanger element from an upstream side to a downstream side, wherein the elongate heat exchanger element is located parallel to the longitudinal center line of the vehicle body.

8. A motorcycle according to claim 7, wherein the elongate heat exchanger element is arranged such that the downstream side of the elongate heat exchanger element is in fluid communication with an interior of the elongate duct.

9. A motorcycle according to claim 8, wherein the elongate heat exchanger element has a heat exchanger duct separate from the elongate duct, the heat exchanger duct extending from a heat exchanger intake to the upstream side of the elongate heat exchanger element such that a flow path is defined from the elongate heat exchanger intake through the heat exchanger element into the interior of the elongate duct.

10. A motorcycle according to claim 1, wherein the or each inlet aperture, the or each outlet aperture and the elongate duct are located and arranged to define a line of sight between at least a part of one or more inlet apertures and at least a part of one or more outlet apertures through the elongate duct in a direction parallel to the longitudinal center line plane of the vehicle body.

11. A motorcycle according to claim 1, wherein the elongate duct comprises an inlet portion adjacent the or each inlet aperture, a central portion and an outlet portion adjacent the or each outlet aperture, and wherein the central portion of the duct has a smaller cross sectional area than the or each inlet aperture and/or the or each outlet aperture.

12. A motorcycle according to claim 11, wherein the inlet portion of the duct tapers inwardly from the or each inlet aperture towards the central portion such that the cross-sectional area of the inlet portion of the duct decreases from the or each inlet aperture to the central portion and/or the outlet portion of the duct tapers outwardly from the central portion towards the or each outlet such that the cross-sectional area of the outlet portion of the duct increases from the central portion to the or each outlet aperture.

13. A motorcycle according to claim 11, wherein the elongate duct has a central longitudinal axis and wherein one or more interior walls of the inlet portion and/or outlet portion of the duct are arranged at an angle to the central longitudinal axis in a range of 1 to 10 degrees.

14. A motorcycle according to claim 11, wherein the elongate duct has a venturi profile.

15. A motorcycle according to claim 11, wherein the central portion has a cross-sectional area in a range of 10,000 mm$^2$ to 90,000 mm$^2$.

16. A motorcycle according to claim 1, wherein the inlet aperture and/or the outlet aperture has a frontal cross-sectional area between 10 and 40% of a total frontal cross-sectional area of the motorcycle.

17. A motorcycle according to claim 1, wherein the inlet aperture and/or the outlet aperture has a width greater than 50% of the total width of the motorcycle body.

18. A motorcycle according to claim 1, wherein the inlet aperture, the outlet aperture and/or the elongate duct has a rectangular cross-section and/or the elongate duct comprises planar surfaces.

19. A motorcycle according to claim 1, wherein the elongate duct further comprises a deflector element movable between a first position and a second position, wherein the deflector is arranged to provide a greater restriction to the airflow through the interior of the elongate duct in the second position relative to the first position.

20. A motorcycle according to claim 1, further comprising one or more further open inlet apertures and/or one or more further open outlet apertures, the open elongate duct extending to the one or more further open inlet apertures and/or the one or more further open outlet apertures.

* * * * *